United States Patent [19]
Hodges et al.

[11] Patent Number: 6,149,811
[45] Date of Patent: Nov. 21, 2000

[54] DREDGING SYSTEM

[75] Inventors: Michael Hodges, Monument; Robert Leland Schwartz, Arvada; George C. Kane, Golden, all of Colo.

[73] Assignee: Solomon Ventures LLC, Lakewood, Colo.

[21] Appl. No.: 09/280,754

[22] Filed: Mar. 29, 1999

Related U.S. Application Data

[60] Division of application No. 08/799,944, Feb. 14, 1997, Pat. No. 5,938,936, which is a continuation-in-part of application No. 08/602,697, Feb. 16, 1996, Pat. No. 5,656,174.

[60] Provisional application No. 60/022,943, Jul. 29, 1996.

[51] Int. Cl.$^7$ .......................... B01D 35/28; B01D 39/10
[52] U.S. Cl. .................. 210/328; 330/335; 330/407; 330/420; 330/486; 330/499; 209/17; 209/274; 209/281
[58] Field of Search .................. 210/323.1, 328, 210/330, 335, 407, 409, 420, 456, 499; 209/274, 280, 281, 17, 18

[56] References Cited

U.S. PATENT DOCUMENTS

| | | |
|---|---|---|
| 1,864,926 | 6/1932 | Moss et al. . |
| 2,204,584 | 6/1940 | Flower . |
| 2,961,782 | 11/1960 | Bos . |
| 3,673,716 | 7/1972 | Trondle . |
| 3,975,266 | 8/1976 | Baize . |
| 4,113,626 | 9/1978 | Detcher .................. 210/409 |
| 4,541,927 | 9/1985 | Breidenbaugh . |
| 4,671,877 | 6/1987 | Godbeer .................. 210/409 |
| 4,807,373 | 2/1989 | Sloan et al. . |
| 4,854,058 | 8/1989 | Sloan et al. . |
| 5,262,064 | 11/1993 | El-Shall .................. 210/747 |

OTHER PUBLICATIONS

Church, et al., "Bureau of Mines Dewatering Study To Recover A Marketable Product From An Industrial Crushed Stone Fine By-Product Slurry", SME Annual Meeting, Albuquerque, NM, Feb. 14–17, 1994.

Scheiner, "Dewatering Of Fine Particle Clay Waste Using A Flocculant", SME—AIME Annual Meeting, Atlanta, Georgia, Mar. 6–10, 1983.

Scheiner, et al., "Factors Affecting Dewatering of Phosphatic Clay Waste Slurries", SME Annual Meeting, Denver, Colorado, Feb. 24–27, 1987.

Smith, "Characterization of Dredged River Sediments in 10 Upland Disposal Sites in Alabama", Report of RI 9549, Investigations/1995, U.S. Bureau of Mines, U.S. Department of the Interior.

Sharma, et al., "Dewatering of Alaska Placer Effluent Using PEO", RI 9442, Report of Investigations/1992, Bureau of Mines, U.S. Department of the Interior.

Zatko, et al., "Preliminary Studies on the Dewatering of Coal–Clay Waste Slurries Using a Flocculant", RI 8636, Bureau of Mines Report of Investigations/1982, U.S. Department of the Interior.

Brooks, et al., "Large-Scale Dewatering of Phosphatic Clay Waste From Polk County, FL", RI 9016, Bureau of Mines Report of Investigations/1986, U.S. Department of the Interior.

Church, et al., "Dewatering Of Mine Waste Sludges", U.S. Bureau of Mines, Tuscaloosa Research Center, Tuscaloosa, AL. (not dated).

Scheiner, "Dewatering Fine Ground Waste From Quarries", U.S. Bureau of Mines, Tuscaloosa Research Center, Tuscaloosa, AL. (not dated).

Church, et al., "Dewatering of Contaminated River Sediments" presented Dec. 9, 1993.

*Primary Examiner*—David A. Reifsnyder
*Attorney, Agent, or Firm*—Sheridan Ross P.C.

[57] ABSTRACT

The present invention is directed to a continuous, portable dredging system that employs a series of screens and gravity separation devices with flocculation to remove sediments from the dredged slurry. The system produces a treated water stream having low solids content and a recovered solids product having a low water content.

12 Claims, 18 Drawing Sheets

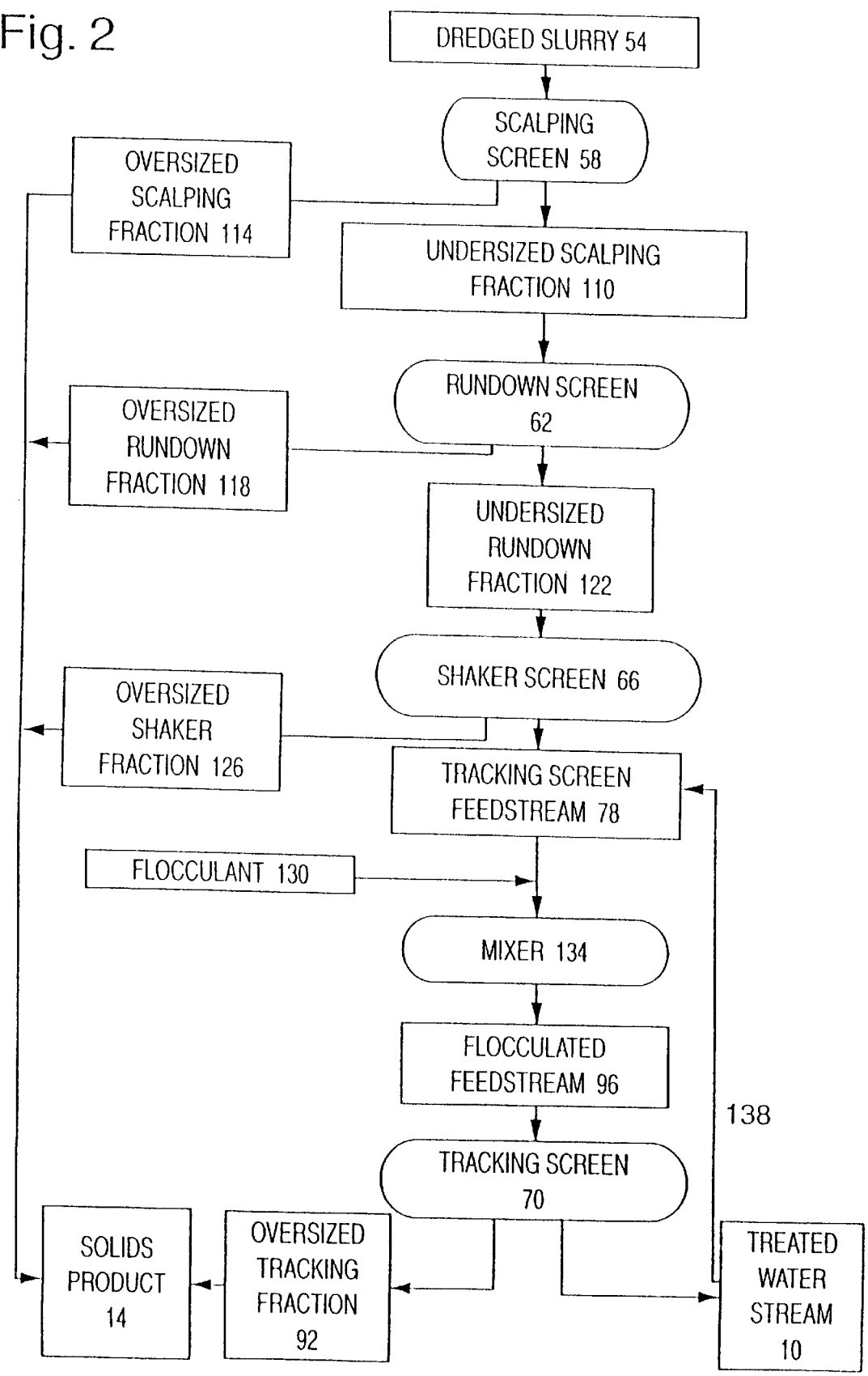

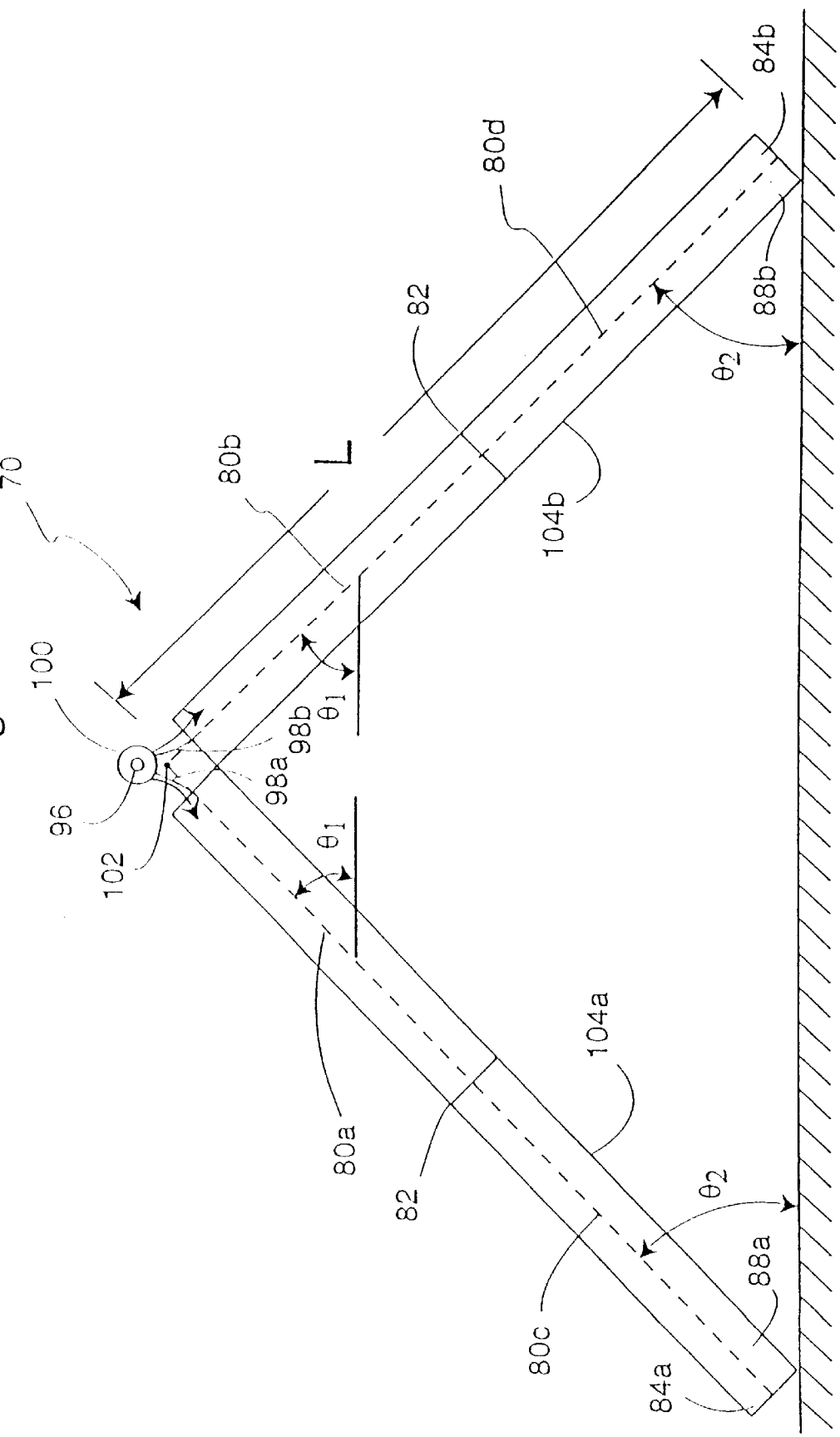

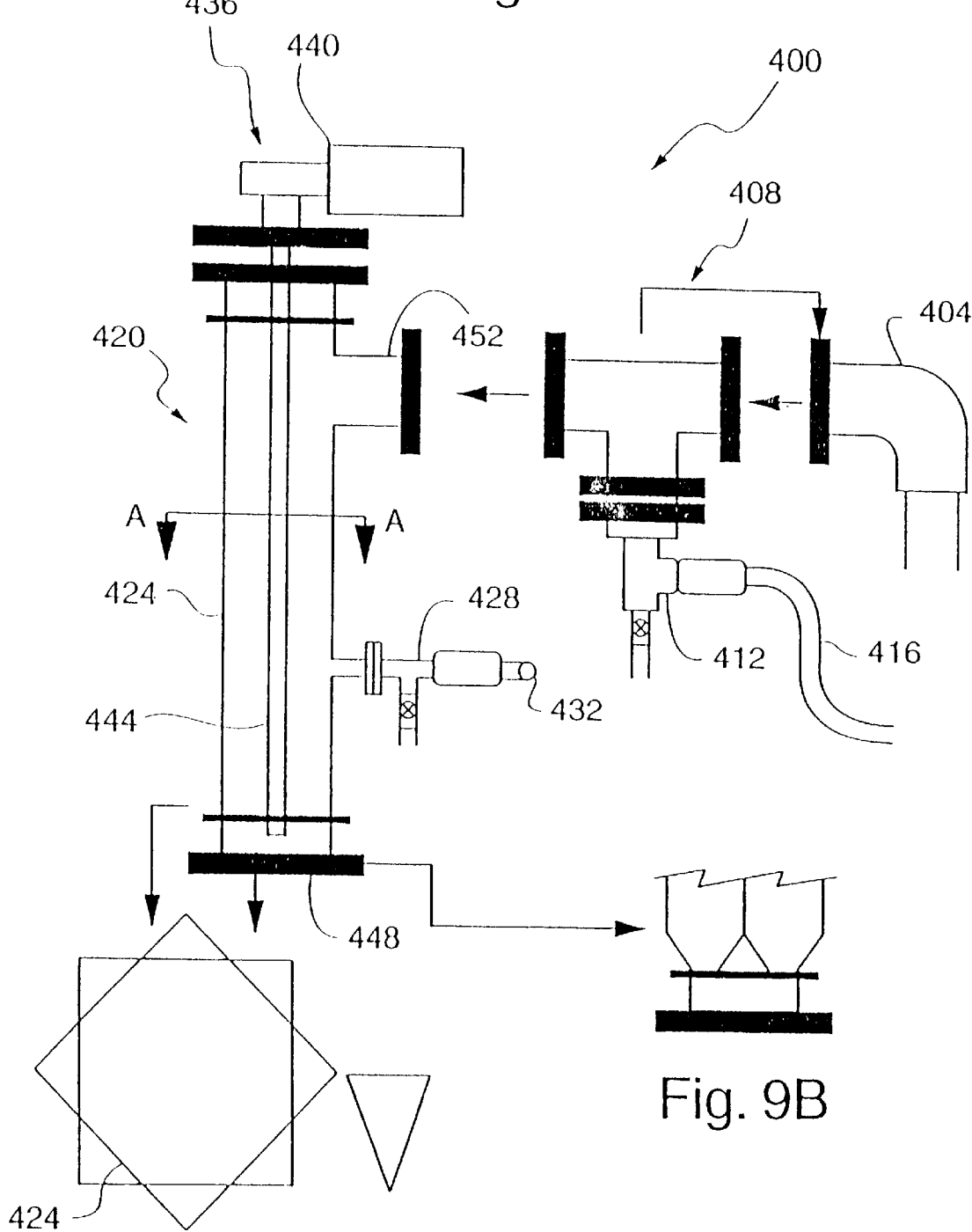

Fig. 10A
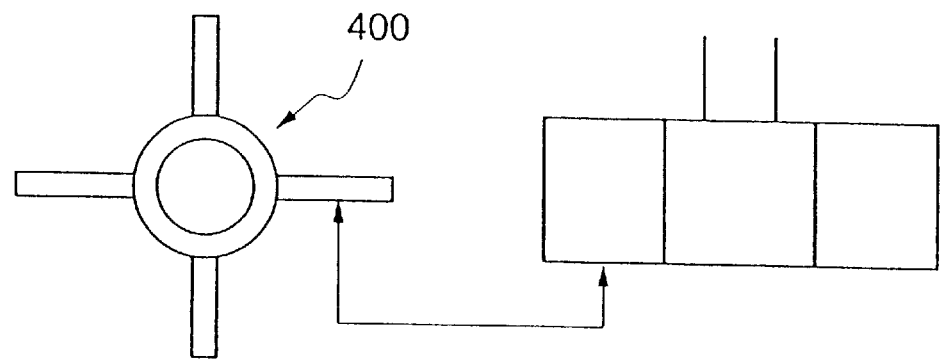
Fig. 10B
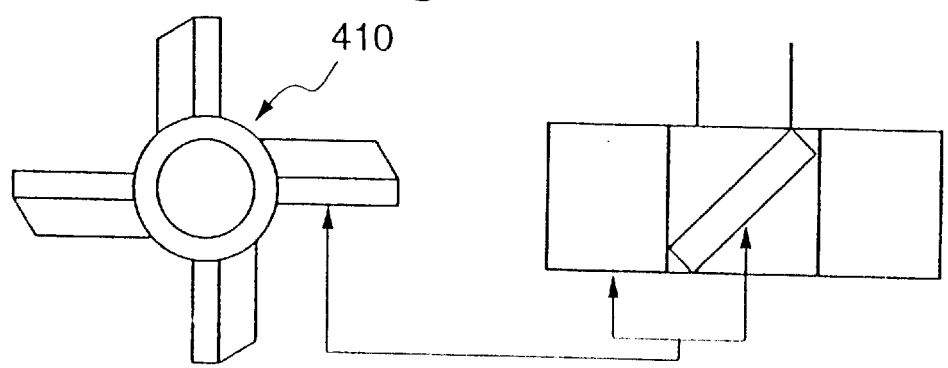
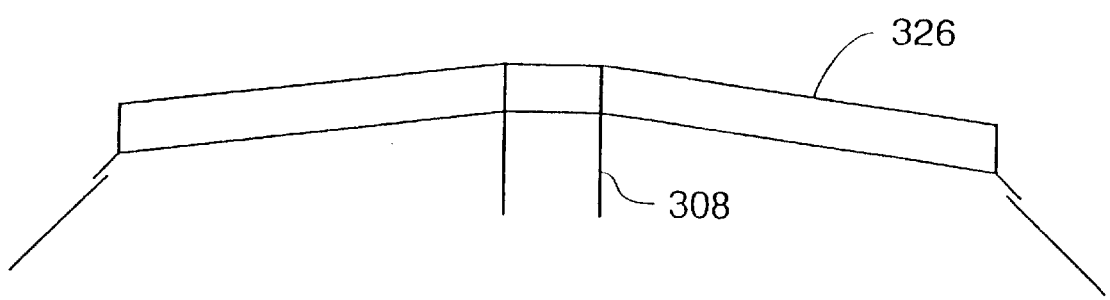
Fig. 11

DREDGING SYSTEM

CROSS REFERENCE TO RELATED APPLICATIONS

The present application is a divisional of U.S. application Ser. No. 08/799,944 filed Feb. 14, 1997, now U.S. Pat. No. 5,938,936 which is a continuation-in-part of U.S. application Ser. No. 08/602,697, filed Feb. 16, 1996, now U.S. Pat. No. 5,656,174, the disclosure of each of are incorporated by reference in their entireties, and U.S. application Ser. No. 08/799,944 filed Feb. 14, 1997, now U.S. Pat. No. 5,938,936 also claims priority from U.S. Provisional Application having Ser. No. 60/022,943, filed Jul. 29, 1996.

FIELD OF THE INVENTION

The present invention relates generally to dredging systems and specifically to portable dredging systems for waterways and other bodies of water.

BACKGROUND OF THE INVENTION

Dredges remove underwater sediments, such as sand and silt, from ponds, lakes, streams, rivers, bays, harbors and other bodies of water to clear navigation channels, prevent filling of the body of water with accumulated sediments, and remove environmental contaminants contained in the sediments. Dredges commonly are floating barges having a cutting head and pumping system to remove the sediments and a discharge line to transport the slurried sediments to an onshore location for storage, treatment and/or disposal.

Settling ponds are often used to store the dredged slurry, to separate the sediments, and to decant the water in the slurry from the sediments. The separated water can then be returned to the body of water. The sediments can be left in the settling pond or transported to a disposal site. Disposal sites are desirable for sediments containing environmentally harmful contaminants.

A problem with such operations, especially high capacity operations, is the requirement of a sizable land area to accommodate the settling ponds and the resulting loss of aesthetics, the prolonged time period required to dry the sediments in the settling pond, the significant water loss from the body of water through drainage or evaporation, and the offensive odor generated by the decomposition of the organic material in the drying sediments. Moreover, any precipitation will only extend the solids drying process. Often, the body of water must be closed to public access during dredging operations because the settling ponds are located nearby. In other cases, such as the dredging of bodies of water in densely populated areas, dredging/settling pond operations are uneconomical because of the lack of available land to accommodate settling ponds. The cost to transport the slurried sediments by truck or pipeline to a remote location can also be prohibitive.

In an attempt to overcome such limitations, the dredging barge disclosed in U.S. Pat. No. 4,541,927 to Breidenbaugh was developed. The barge includes a centrifuge and screen to separate the sediments from the slurry, a rotating tumbler to aerate the sediments, a rotary kiln to dry the sediments, and equipment to package the dried sediments for sale or disposal.

The dredging barge of Breidenbaugh is relatively complex and expensive to operate and therefore unsuitable for many applications. By way of example, the Breidenbaugh barge cannot operate continuously but only semi-continuously and therefore has a low capacity. For semi-continuous operation to be possible, it employs a number of centrifuges mounted on a rotating table. The centrifuges are expensive to operate and subject to frequent damage from large objects, such as rocks, bottles, and other debris in the sediments. Furthermore, the water produced by the system has a significant solids content when discharged, which can cause problems in applications such as those requiring low turbidity discharge water or involving the removal of environmental contaminants from the water body. This is particularly true where the sediments include material having a specific gravity close to one.

SUMMARY OF THE INVENTION

It is therefore an object of the present invention to provide a simple and inexpensive dredging system that incorporates a solids/liquid separation system. Related objectives are to provide a dredging system that eliminates or minimizes the need for settling ponds to separate water from the slurried sediments; to provide an integrated system that can continuously separate the slurried sediments from water in the dredged slurry at high throughput rates; to provide a dredging system that eliminates or minimizes the use of centrifuges; and, to the extent that centrifuges are used, to provide a system that minimizes damages to the centrifuges by objects contained in the sediments.

It is another objective to provide a dredging system that can remove substantially all of the sediments from the dredged slurry to provide a low turbidity water product for reintroduction into the body of water.

These and other objectives are addressed by the present invention. The present invention provides a dredging system for removing solid materials from a body of water that includes: (i) a dredging device for removing solid materials from the body of water to form a dredged slurry containing the removed solid materials and water; (ii) a transportation device to transport the dredged slurry from the dredging device; (iii) a first separating device for separating the solid materials having a size of at least about 150 microns from the dredged slurry to form a treated slurry; (iv) a flocculating device to contact a flocculent with the treated slurry to form a flocculated slurry containing flocculated solid materials; and (v) a second separating device to separate the flocculated solid materials from the treated slurry to form a treated water stream and a dewatered solids product. The various components can be located entirely on the dredging barge, on the barge and one or more portable trailers, or in a permanent (non-portable) installation.

The first separating device can include a first screen having a size ranging from about 10 mesh (Tyler) to about 2 inches and a second screen having a size ranging from about 10 mesh (Tyler) to about 200 mesh (Tyler). Depending upon the application, the first separating device can include additional components, such as a gravity separation device.

The flocculent causes agglomeration of fine solid materials, which facilitates separation of the fine materials by the second separating device. A "flocculent" refers to a material that causes aggregation of suspended colloidal or other fine particles in a solid/liquid slurry. Anionic, non-ionic or cationic flocculents or coagulants can be employed. Preferred flocculents include polyacrylamides, and mixtures thereof. The preferred concentration of the flocculent in the slurry to be flocculated ranges from about 0.001 to about 0.0250% by weight. The flocculent is necessary for the performance of the second separating device.

The second separating device can be a first screen and a second screen arranged in a triangular-shaped configuration (i.e., an A-frame construction). The angle of the screens measured from the horizontal preferably ranges from about 30 to about 70 degrees. The mesh of the screen has a size ranging from about 1.7 mm to about 0.3 mm. This device has proven highly effective in separating the flocculated solid materials from the slurry at a high rate (i.e., ranging from about 0.4 to about 1.6 gallons per minute per square foot of screen surface area).

The dredging system can include other components to provide a lower percentage of solid materials in the treated water stream. By way of example, the system can include one or more gravity separation devices, such as a cyclone or centrifuge, to remove heavy solid materials. The system can also include a flotation device, such as an induced air or dissolved air flotation device, to float the flocculated solid materials. These components are especially useful in cases where low turbidity discharge water is required or environmentally hazardous materials are present in the dredged slurry.

In another aspect, the present invention provides a dredging method for removing solid materials from a body of water that includes the steps of: (i) dredging solid materials from the body of water to form the dredged slurry; (ii) first separating the removed solid materials having a size of at least about 150 microns from the dredged slurry to form the treated slurry; (iii) contacting the treated slurry with the flocculent to form the flocculated slurry containing the flocculated solid materials; and (iv) separating flocculated solid materials from the treated slurry to form the treated water stream and a dewatered solids product.

The present invention provides a number of advantages relative to existing dredging operations. The present invention can eliminate the need for settling ponds to effect separation of the water and solid materials in the dredged slurry. It offers a simple and inexpensive method to operate and is capable of high throughput rates. It can eliminate or minimize the need for expensive gravity separation devices, such as centrifuges and cyclones, by replacing them with a number of stationary and/or moving screens. The present invention can be operated continuously, thus further reducing operating costs, and its design permits components of the system to be located at distances of up to one-half mile or more from the dredging device itself. The present method provides a dewatered solids product having a relatively low free water content that is ready for immediate transport by conventional solids handling systems to a desired location or disposal site. Finally, the present invention provides a treated water stream having an extremely low percentage of retained solid materials.

One aspect of the present invention relates to a particular screening device that facilitates removal of fine solids to provide a stream of relatively solid-free effluent. The screen device has an A-frame construction with the screens forming the legs of the device. The angle of the screen as measured from the horizontal preferably ranges from about 30 to about 70 degrees. In one configuration, each leg of the screen device includes an upper and lower screen. The angle of the upper screens as measured from the horizontal can be different from the angle of the lower screens as measured from the horizontal. The opening size of the upper and lower screens can differ, with the upper screens having a smaller opening size than the lower screens to facilitate dewatering of the collected solids.

BRIEF DESCRIPTION OF THE DRAWINGS

FIG. 2 is a flow schematic of the preferred embodiment depicted in FIG. 1;

FIGS. 3A–B are cross-sectional views of different embodiments of the tracking screen;

FIG. 8C a section along lines B—B; and FIG. 8D a section along lines C—C;

FIGS. 9A–C depict the vertical in-line mixer of the embodiment with FIG. 9C being a view along line A—A of FIG. 9A;

FIGS. 10A and B depict the turbine propeller (FIG. 10A) and the impeller (FIG. 10B);

FIG. 11 depicts the upper end of the tracking screen;

DETAILED DESCRIPTION

Figure 1:
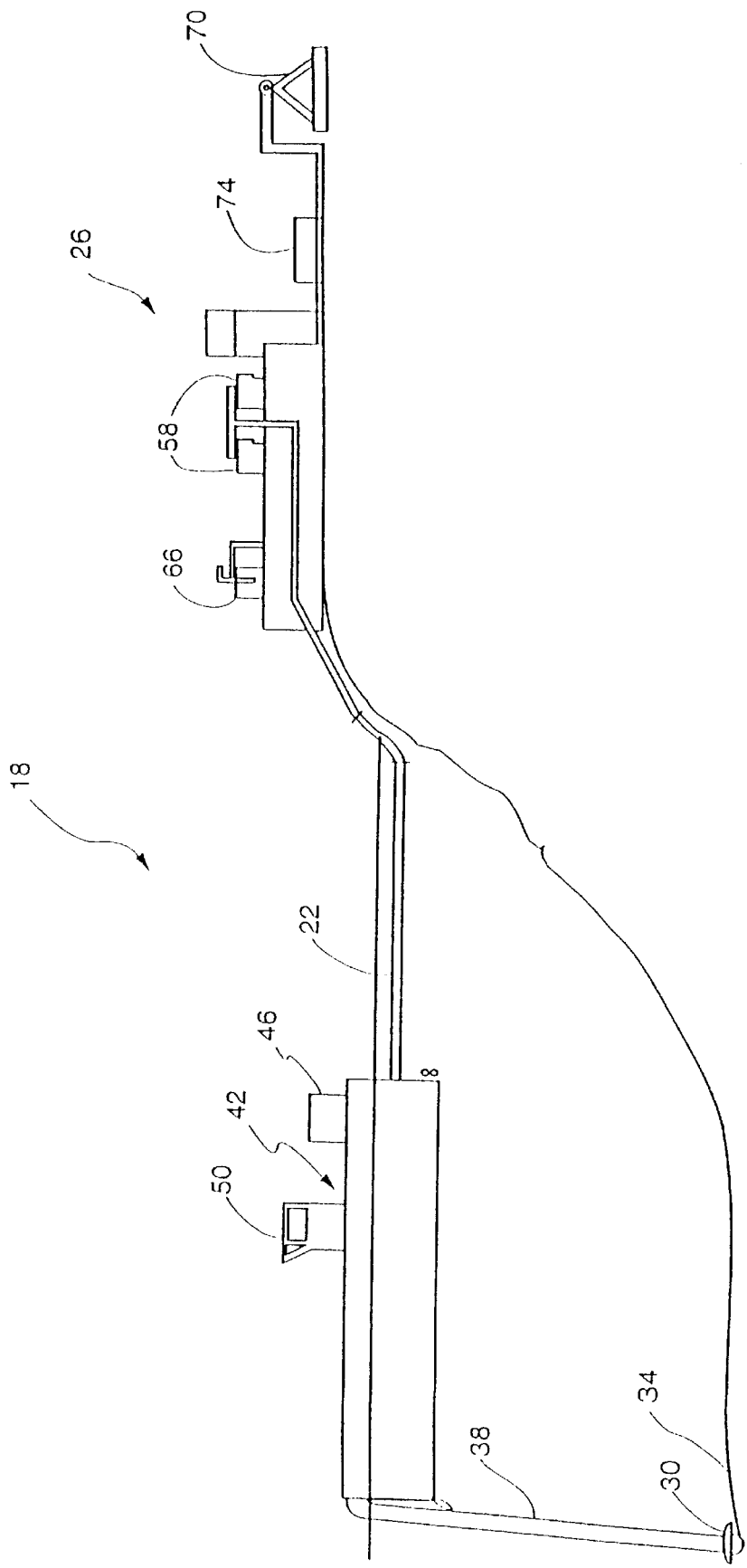
FIG. 1 is a perspective view of a preferred embodiment of the present invention.

FIGS. 1–2 depict a preferred embodiment of a dredging system according to the present invention that can remove and treat sedimentary materials from bodies of water, such as ponds, lakes, streams, rivers, and other waterways, at relatively high rates to provide a treated water stream 10 and a solids product 14. As shown in FIGS. 1–2, the dredging system includes a dredge assembly 18, a slurry pipeline 22, and a water treatment assembly 26.

The dredge assembly 18 in the dredging system can include a cutting head 30 for dislodging sediments 34, a suction line 38 for removal of the dislodged sediments, and a barge subassembly 42. The barge subassembly 42 further includes a motor 46, a drive train (not shown), lift pumps (not shown), and a pilot house 50. The dredge assembly 18 can be a hydraulic dredge as shown in FIG. 1 or a dipper or elevator dredge. Although the desired capacity of the dredge assembly 18 depends upon application, the dredge assembly 18 preferably has a capacity of at least about 800 and more preferably from about 1000 to about 1400 gpm. Hydraulic dredges are preferred, because dipper and elevator dredges generally have significantly lower capacities than hydraulic dredges.

The slurry pipeline 22 in the dredging system transports the dredged slurry 54 from the dredge assembly 18 to the water treatment assembly 26. The slurry pipeline is generally of a hard plastic or aluminum construction with flexible rubber hose attachments.

The water treatment assembly 26 in the dredging system can include a scalping screen 58, a rundown screen 62, a shaker screen 66, a tracking screen 70, and a generator 74. As will be appreciated, the screen types and numbers of each type of screen in the assembly 26 depend upon the characteristics of the sediments and the desired throughput.

The assembly 26 in FIGS. 1–2 is applicable to dredged slurries having particles of a broad range of sizes. For example, a typical dredged slurry for this assembly 26 has solids ranging in size from about 1 micron to about 6 inches and more typically from about 1 micron to about 4 inches. More uniform dredged slurries may require fewer types of screens and/or fewer screens of a given type.

The water treatment assembly 26 can be mounted on one or more trailers and be self-contained for portability. The use of the assembly 26 permits a body of water to be dredged without using excessive land areas as settling ponds.

Accordingly, bodies of water, such as ponds on golf courses, can be dredged without closing the water bodies or adjacent areas to the public.

The scalping screen 58, rundown screen 62, and shaker screen 66 in the water treatment assembly 26 are preferably sized to provide a tracking screen feedstream 78 with at least about 95% by weight of the contained solids having a particle size of preferably no more than about 180 microns, more preferably no more than about 75 microns, and most preferably no more than about 37 microns. The scalping screen 58 preferably has a screen size no coarser than about 2 inches and more preferably ranges from about 1 to about 0.25 inches. The rundown screen 62 preferably has a screen size no coarser than about 0.25 inches and more preferably ranges from about 4 to about 35 mesh (Tyler). The shaker screen 66 preferably has a screen size no coarser than about 48 mesh (Tyler) and more preferably ranges from about 65 to about 150 mesh (Tyler). The scalping screen 58, rundown screen 62, and shaker screen 66 can be a linear shaker, trommel, stationary or any other suitable type of screening device. Preferably, the scalping and shaker screens are each a Model 58 FLO-LINE CLEANER PLUS manufactured by DERRICK CORPORATION.

The preferred embodiment of the tracking screen 70 in the water treatment assembly 26 is depicted in FIG. 3A. The tracking screen is an A-frame-shaped device having two upper screens 80a,b and two lower screens 80c,d connected by way of an articulated joint 82a,b to the lower ends of the upper screens 80a,b. The angle $\theta_1$ from the horizontal for the two upper screens 80a,b preferably ranges from about 40 to about 70 degrees, more preferably from about 45 to about 65 degrees, and most preferably from about 50 to about 60 degrees. The angle $\theta_2$ from the horizontal for the two lower screens 80c,d preferably ranges from about 30 to about 60 degrees, more preferably from about 35 to about 55 degrees, and most preferably from about 40 to about 50 degrees. The angles $\theta_1$ and $\theta_2$ differ in magnitude to control the velocity of the agglomerated particles. Preferably, $\theta_1$ is larger than $\theta_2$. The angles $\theta_1$ and $\theta_2$ can, however, also be the same magnitude as shown in FIG. 3A. The articulated joints 82a,b and pivot point 100 permit the angles $\theta_1$ and $\theta_2$ to be adjusted during operation of the tracking screen.

Figure 3B:
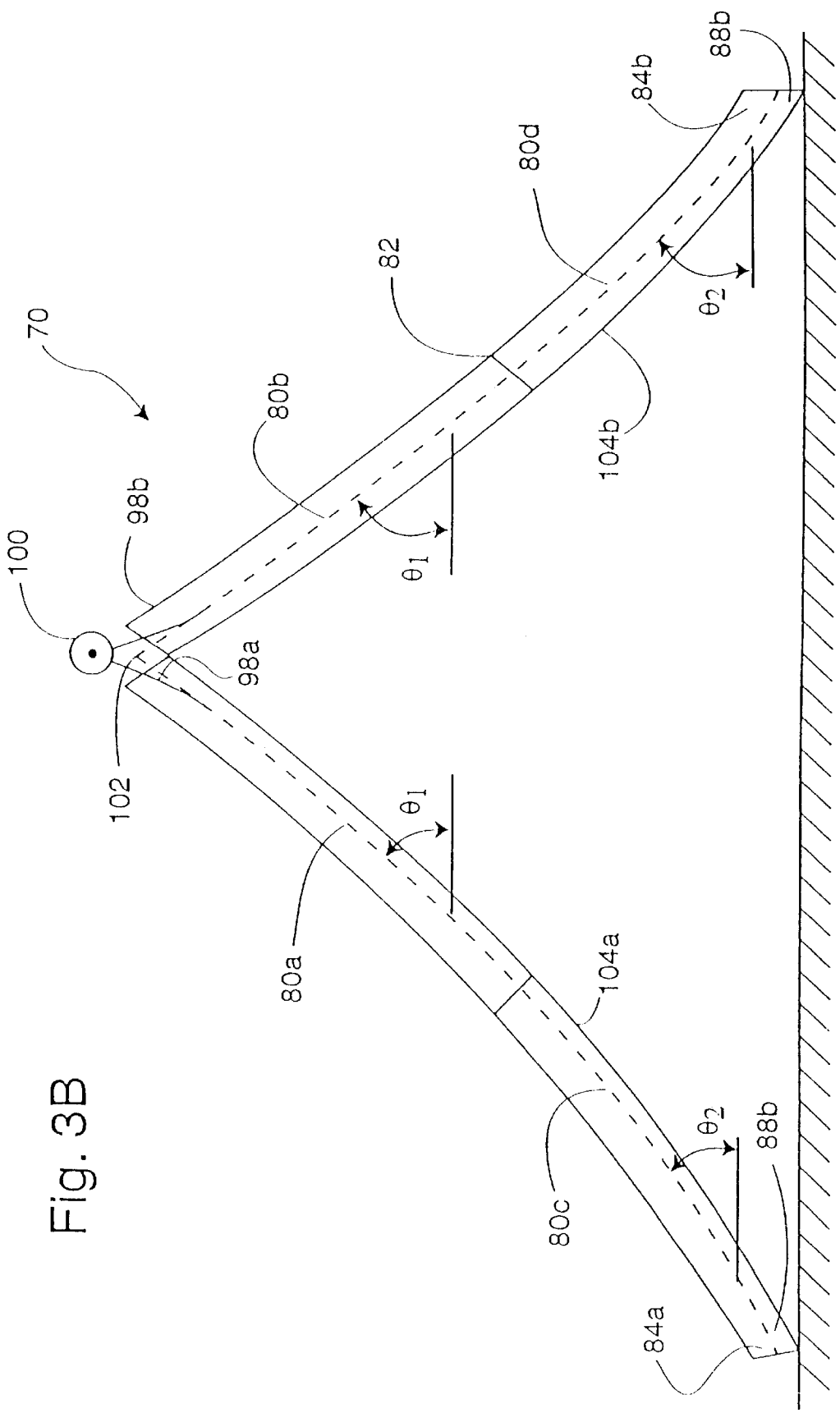

The angles $\theta_1$ and $\theta_2$ are important to controlling the final particle size of the agglomerated particles in the oversized tracking fraction 92. As will be appreciated, the size of the agglomerated particles increases as the agglomerated particles roll down the upper and lower screens. The effect is very similar to a snowball increasing in size as it rolls down a snow-covered hill. To maximize the size increase of the agglomerated particles on the lower screen, it is important that the lower screen have a shallower angle $\theta_2$ than the $\theta_1$ of the upper screen. A shallower angle equates to a lower vertical velocity of the agglomerated particles, which in turn relates to a greater increase in the size of the agglomerated particles due to increased residence time of the agglomerated particles on the lower screen. Preferably, the vertical velocity of the particles on the upper screen ranges from about 0.01 to about 2 fps while the vertical velocity of the particles on the lower screen ranges from about 0.01 to about 0.5 fps. Accordingly, it is desirable that the residence time of the agglomerated particles on the upper screen be less than the residence time of the agglomerated particles on the lower screen to maximize the increase in the size of the agglomerated particles. The larger size of the agglomerated particles equates to a higher degree of dewatering of the oversized tracking fraction 92. The transition from the steeper upper screen to the shallower lower screen can be facilitated by having a curved junction of the upper and lower screens as shown in FIG. 3B. Moreover, other embodiments of the invention are directed to adjustable slopes for angles of the screen surface to accommodate differing conditions relating to the particle size, density, etc. Such adjustments can be achieved by various means known to those with skill in the art.

The total length of the screens 80a–d is preferably sufficient to effectuate separation of substantially all of the particles from the slurry. The total length L (in feet) of each set of upper and lower screens 80a,c and 80b,d preferably ranges from about 4 to about 12, more preferably from about 4 to about 10, and most preferably from about 4 to about 8 feet.

The upper and lower screens preferably have different sized openings to maximize the degree of dewatering of the oversized tracking fraction 92. As noted above, the size of the agglomerated particle on the upper screen is smaller than on the lower screen. Because a larger screen opening size yields a higher degree of dewatering, it is desirable that the lower screen have a larger screen opening size than the upper screen to better dewater the oversized tracking fraction 92. The upper and lower screens can be constructed as woven wire square mesh screens or as slotted wedge-wire screens, and more preferably as slotted wedge-wire screens.

The screen opening size of the two upper screens 80a,b preferably ranges from about 0.3 mm to about 0.9 mm, more preferably from about 0.3 mm to about 0.7 mm, and most preferably from about 0.4 mm to about 0.6 mm. The screen size of the two lower screens 80c,d preferably ranges from about 0.3 mm to about 1.70 mm, more preferably from about 0.4 mm to about 1.0 mm, and most preferably from about 0.6 mm to about 0.9 mm.

The screen sizes of the upper and lower screens are significantly greater than the screen size of the shaker screen 66. For optimal results, it is desired that the nucleation and agglomeration of particles induced by the flocculent be initiated before the contact of the flocculated feedstream 96 with the tracking screen 70. The nucleation and agglomeration processes are a result of the mixing of the flocculent 130 and the tracking screen feedstream 78 coupled with the residence time of the flocculent 130 in the flocculated feedstream 96 before the contact of the flocculated feedstream 96 with the tracking screen 70.

The dredging system 18 described above has a high throughput. By way of example, the maximum capacity of the dredging system preferably ranges from about 300 to about 2,000 gpm, more preferably from about 400 to about 1750 gpm, and most preferably from about 600 to about 1200 gpm of slurried materials. The system 18 is able to produce an amount of solids product 14 ranging from about 20 to about 90, more preferably from about 30 to about 75, and most preferably from about 40 to about 60 cubic yards/hour. The solids product 14 preferably constitutes at least about 70, more preferably at least about 80, and most preferably at least about 90% by weight of the solids in the dredged slurry 54.

The dredging system is capable of producing a solids product having a relatively low water content, and a treated water stream having relatively low solids content. The solids product 14 preferably has no more than about 60% by weight and more preferably no more than about 50% by weight water and most preferably the water content ranges from about 20 to about 40% by weight water. The treated water stream 10 preferably has a solids content of no more than about 20 and more preferably no more than about 10% by weight solids and most preferably ranging from about 0.1 to about 1.5% by weight solids.

In operation (see FIGS. 1 and 2), the cutting head 30 in the dredge assembly 18 is lowered to the sediments 34 at the bottom of the body of water and rotated to cut through and dislodge the sediments 34. As will be appreciated, the cutting head can be a conventional rotary blade device. The cutting head 30 can be operated by the drive train of the dredge assembly 18. To operate and deploy the head, the drive train can include a flexible drive shaft or a drive shaft having a universal joint or a hydraulic motor (not shown) to permit angular redeployment of the cutting head 30 and suction line 38 as desired.

The dislodged sediments are sucked into the suction line 38 to form the dredged slurry 54. The suction line 38 can be articulated in one or more locations along its length for angular deployment. The dredged slurry passes from the suction line 38 through one or more lift pumps (not shown) to the slurry pipeline 22. The slurry pipeline transports the dredged slurry 54 from the dredge assembly 18 to the water treatment assembly 26, which is generally located on shore. As will be appreciated, the water treatment assembly 26 can alternatively be located on a barge for use in densely populated or other inaccessible areas.

The solids content of the dredged slurry 54 can vary depending upon application. Typically, the dredged slurry contains from about 10 to about 400% by weight solids, more typically from about 15 to about 35% by weight solids, and most typically from about 20 to about 30% by weight solids.

The dredged slurry 54 is passed first through the scalping screen 58 and an undersized scalping fraction 110 is then passed through the rundown screen 62 to form an undersized rundown fraction 122. The coarsest particles are thereby removed in an oversized scalping fraction 114 and an oversized rundown fraction 118. The oversized scalping and rundown fractions 114, 118 are combined to form a portion of the solids product 14.

The undersized rundown fraction 122 is next passed through the shaker screen 66 to form a tracking screen feedstream 78 and an oversized shaker fraction 126. The shaker oversized fraction 126 is combined with the oversized scalping and rundown fractions 114, 118 to form a part of the solids product 14. The tracking screen feedstream 78 preferably contains from about 5 to about 15% by weight of solids. To optimize the formation of large, robust, flocculated particles, the tracking screen feedstream contains from about 10 to about 15% by weight of the solids.

A flocculent 130 can be contacted with the tracking screen feedstream 78 to form the flocculated feedstream 96. The flocculent 130 causes agglomeration of the fine particles in the flocculated feedstream and thereby enhances the separation of the particles from the liquid in the feedstream 96. The flocculent 130 is preferably one or more water soluble polymers and more preferably is selected from the groups polyethylene oxide, polyacrylamides, and mixtures thereof. Although the type and amount of flocculent contacted with the tracking screen feedstream depends upon the feedstream characteristics, it is preferred that the amount be at least about 0.001% by weight and more preferably range from about 0.005 to about 0.25% by weight and most preferably range from about 0.010 to about 0.20% by weight of the tracking screen feedstream. An in-line mixer 134 can be employed to mix the flocculent 130 with the tracking screen feedstream 78. To provide adequate mixing, the velocity through the in-line mixer is preferably at least about 1 fps and most preferably ranges from about 1.5 to about 10 fps. The flocculent is prepared and diluted by calibrated metering pumps and appropriate mixers.

For best results, the flocculent is added at a number of isolated points upstream of the in-line mixer. It has been discovered that multiple-point injection requires less flocculent than single-point injection for adequate flocculation. By way of example, for single-point injection, the most preferred flocculent dosage ranges from about 2.5 to about 3.0 lbs/ton of solids in the tracking screen feedstream and for dual-point injection from about 1.8 to about 2.0 lbs/ton.

Before flocculation, the tracking screen feedstream 96 can be combined with a tracking screen recycle feedstream 138 (to reclaim the flocculent in the recycle feedstream, minimize external dilution, and maintain a constant slurry density) and passed through the tracking screen 70 to form oversized tracking fraction 92, and treated water stream 10. The tracking screen recycle feedstream 138 is a split of the treated water stream 10. The recycle feedstream preferably ranges from about 5 to about 50% by volume of the treated water stream 10.

Referring to FIG. 3A, the operation of the tracking screen 70 will be described. The flocculated feedstream 96 is introduced at the top of the screens 80a,b in an overhead conduit 100. The flocculated feedstream 96 is depicted as an arrow coming out of the plane of the page. The feedstream 96 passes over weirs along the length of the conduit 100. It has been discovered that 90% or more of the water in the feedstream 96 passes through the upper 50% of the cross-sectional area of each upper screen. The oversized tracking fraction 92 flows down the length of each screen and discharges at the upper portion 84a,b of the leg base. The treated water stream 10 flows down an inner surface 104a,b that is impervious to water and discharges at the lower portion 88a,b of the leg base. The fraction 92 and stream 10 are collected and routed to the appropriate location.

It is important that the velocity of the tracking screen feedstream be maintained at levels sufficiently low to inhibit comminution of the flocculated particles. The preferred velocity of the feedstream is no more than about 4, more preferably ranges from about 0.25 to about 2 and most preferably ranging from about 0.5 to about 1.0 fps. It is further important that the agglomerated particles in the feedstream not be allowed to free fall onto the tracking screen surface. The vertical free fall distance between the point of discharge of the agglomerated particles from the overhead circuit 100 and the tracking screen surface first contacted by the particles is preferably no more than about 1, more preferably no more than about 0.5 inches, and most preferably eliminated by the use of flexible impermeable membranes to transition the slurry overflow from the conduit to the screens. The preferred composition of the membrane is polyethylene-impregnated fabric.

The flexible impermeable membranes 98a,b transition the flow from the conduit to the upper screens and from the upper screens to the lower screens without a vertical free fall of the flocculated feedstream onto the screens. As will be appreciated, the kinetic energy of such a free fall can cause the agglomerated particles to disintegrate or break apart. The membrane is preferably flexible so that it will flex in response to the adjustment of the angles $\theta_1$ and $\theta_2$ of the upper and lower screens.

The oversized tracking fraction 92 is combined with the above-noted oversized fractions 114, 118, and 126 to form the dewatered solids product 14. The dewatered solids product 14 can be used for various purposes, such as fill material for landscape contouring or topsoil addition.

The treated water stream can be reintroduced into the body of water that is being dredged.

The instantaneous separation of fine and ultrafine materials from the dredged slurry at high throughput rates is a surprising and unexpected result. Existing dredging systems have been unable to instantaneously separate fine and ultrafine material because of the difficulty, if not impossibility, of removing the fine and ultrafine material using gravity or size separation techniques.

Alternative embodiments of the present invention can be employed depending upon the characteristics of the sediments to be processed and the dewatered product and treated water stream to be produced. As will be appreciated, equipment configuration, process condition criteria (e.g., screen sizes, solids densities, flowrates, and chemical additions), and job specific subcomponents depend upon the feed rate, the dredged slurry solids content, the dredged slurry particle size distribution, the solids separation efficiency of the specific equipment with respect to each size fraction in the dredged slurry, and the flow distribution, among other things.

Figure 4:
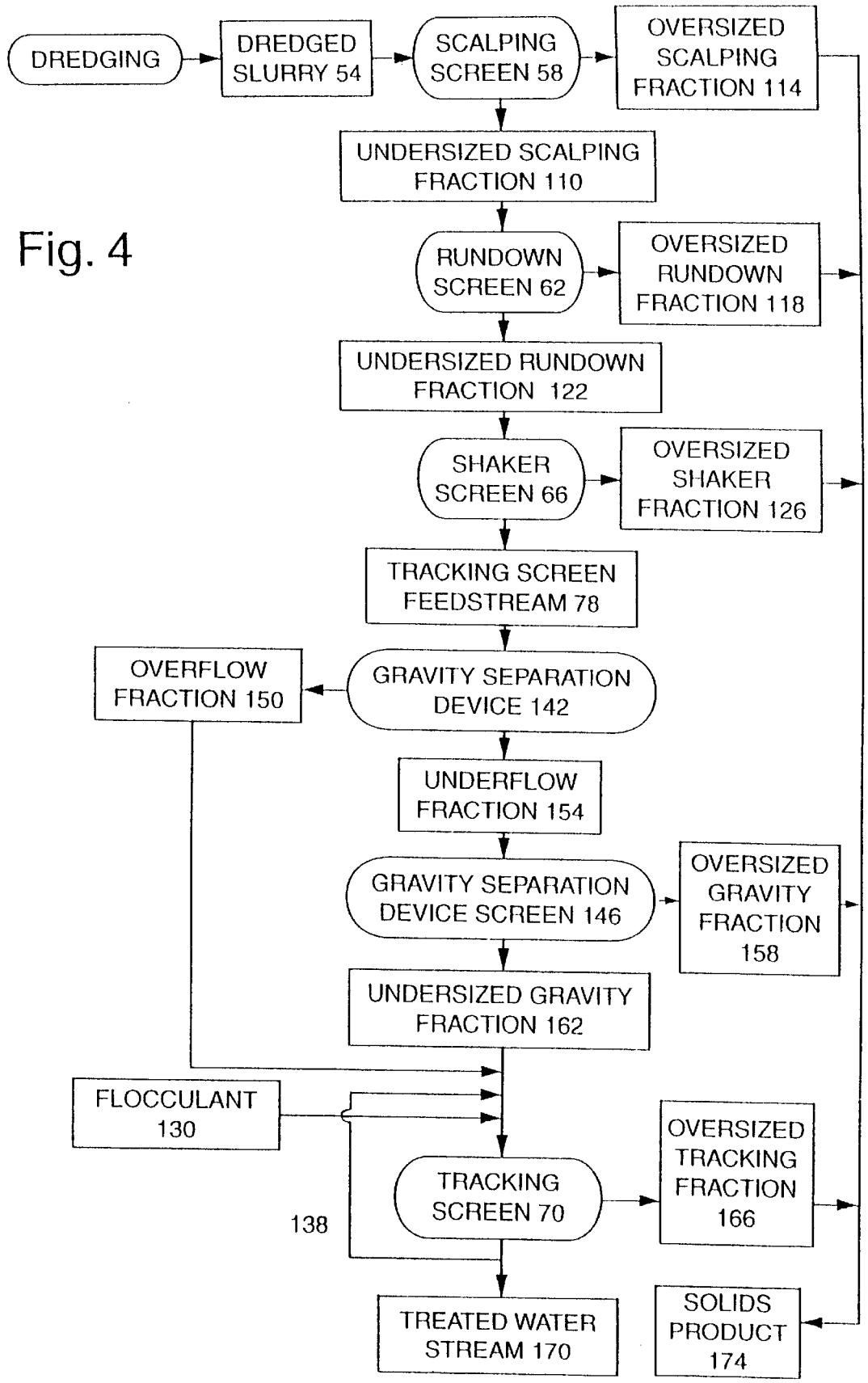
FIG. 4 is a flow schematic of a second embodiment of the present invention.

In a second embodiment shown in FIG. 4, the water treatment system includes a gravity separation device 142 and a gravity separation device screen 146. The gravity separation device 142 and screen 146 together enhance the efficiency of the tracking screen 70 by removing additional solids before screening. The gravity separation device 142 can be a cyclone, centrifuge, and the like. The preferred gravity separation device 142 is a HI "G" DRYER manufactured by DERRICK CORPORATION. The screen 146 preferably has a screen size ranging from about 100 to about 270 mesh (Tyler) This embodiment is not beneficial where a significant portion of the removed solid materials has a specific gravity close to one.

The operation of the second embodiment is similar to the preferred embodiment with certain exceptions. The tracking screen feedstream 78 is first passed through the gravity separation device 142 to form an overflow fraction 150 and an underflow fraction 154. The underflow fraction 154 is passed through the screen 146 to form an oversized gravity fraction 158 and an undersized gravity fraction 162. The overflow fraction 150 and the undersized fraction 162 are combined and contacted with the flocculent 130 and recycle stream 138 and passed over the tracking screen 70 to form the treated water stream 170 and oversized tracking fraction 166. The oversized tracking fraction 166 forms a part of the dewatered solids product 174.

Figure 5A:
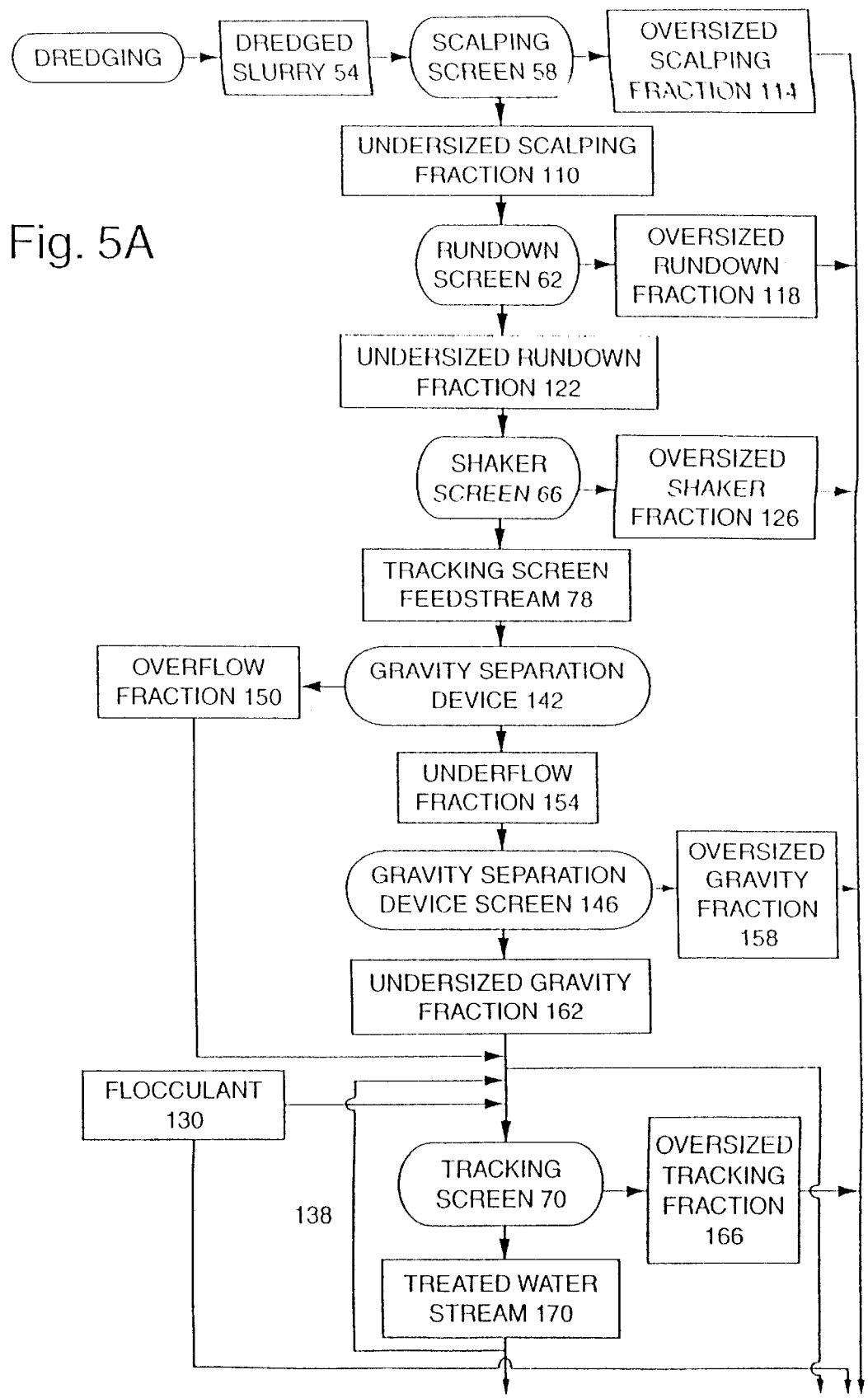
FIGS. 5A–B are flow schematics of a third embodiment of the present invention.
Figure 5B:
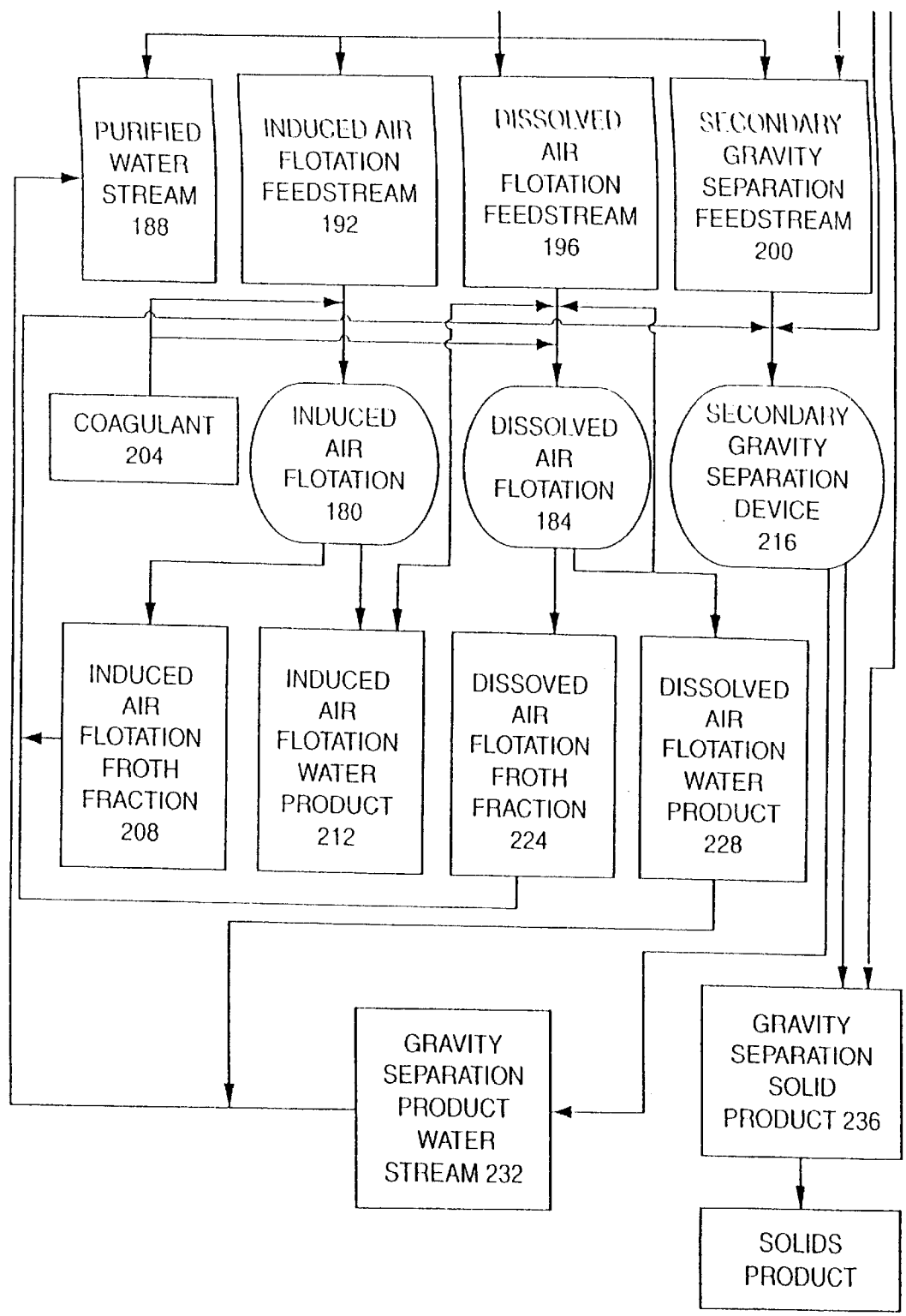
Figure 6:
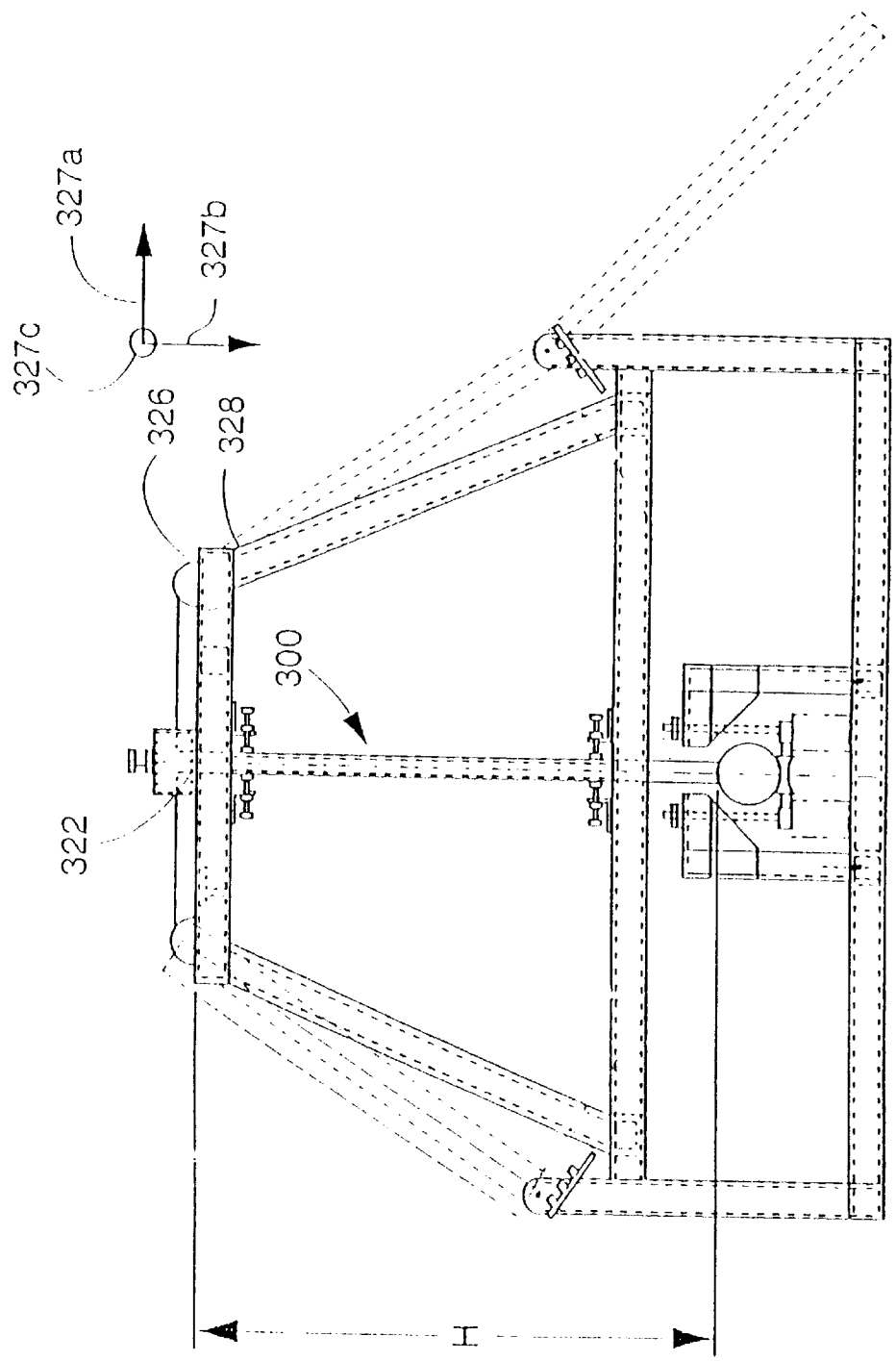
FIGS. 6 and 7 depict an alternative embodiment of the tracking screen.
Figure 7:
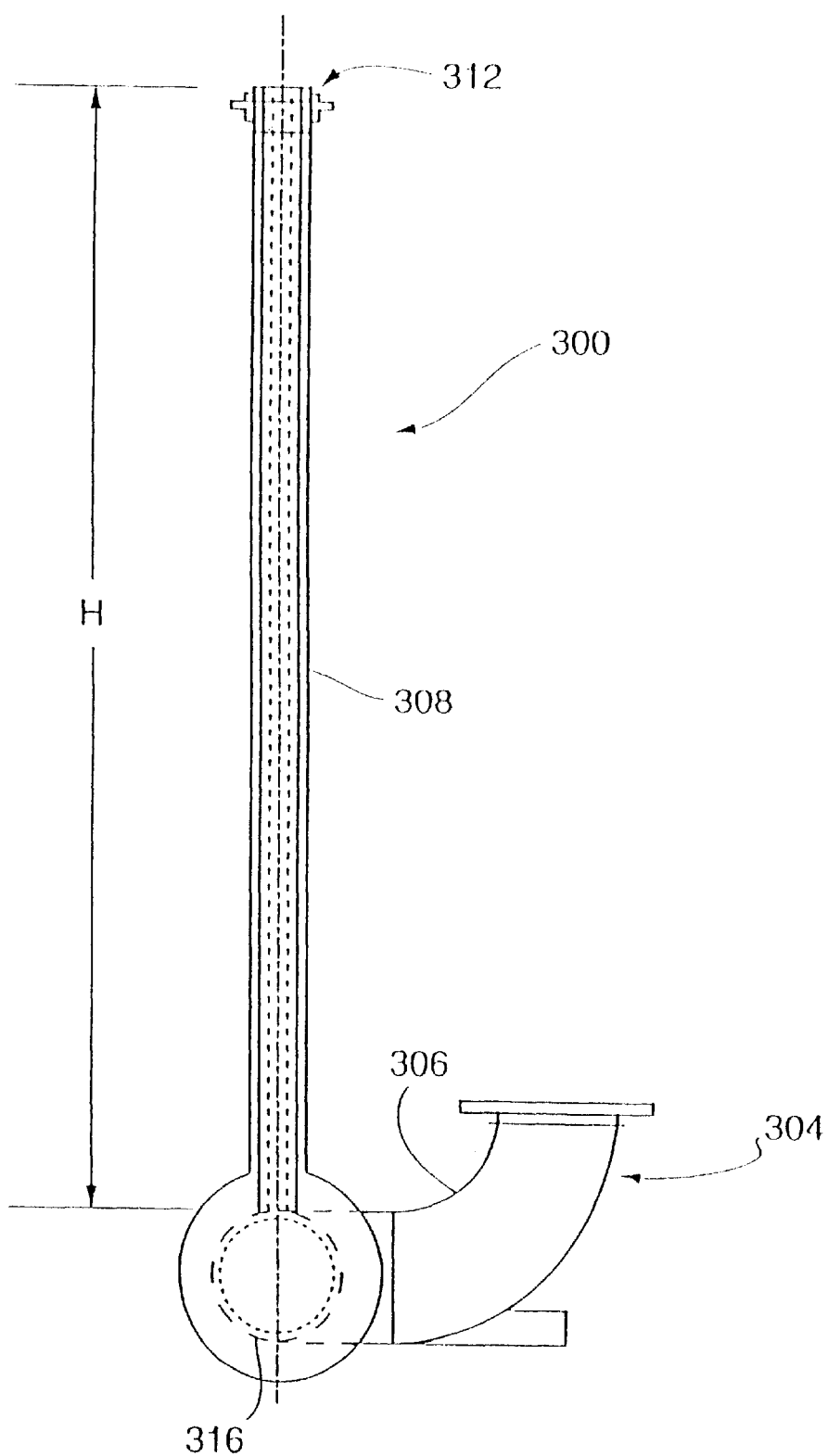
Figure 8A:
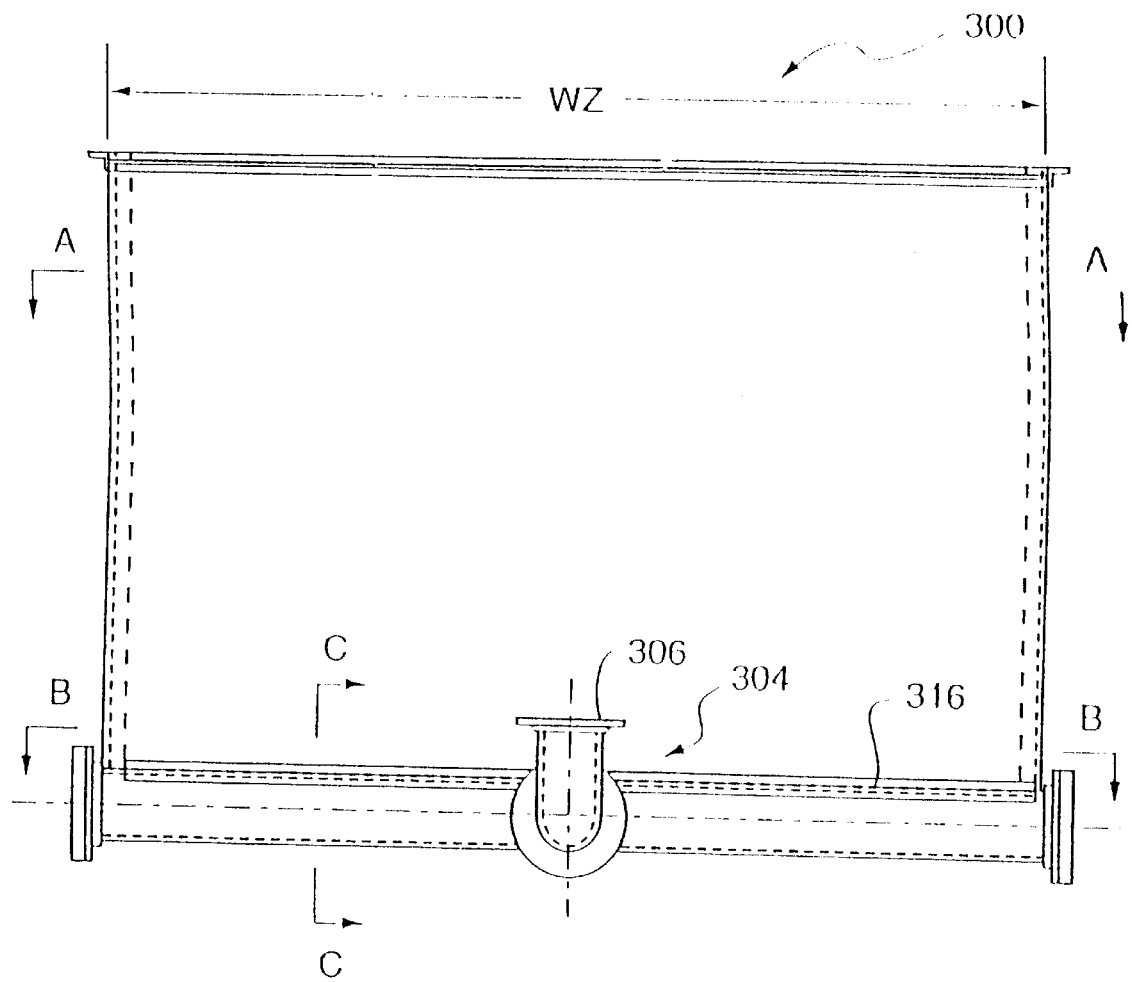
FIGS. 8A–D depict various views of the vertical slot feeder of the embodiment of FIGS. 6 and 7 with FIG. 8B being a section along lines A—A of FIG. 8A.
Figure 8B:
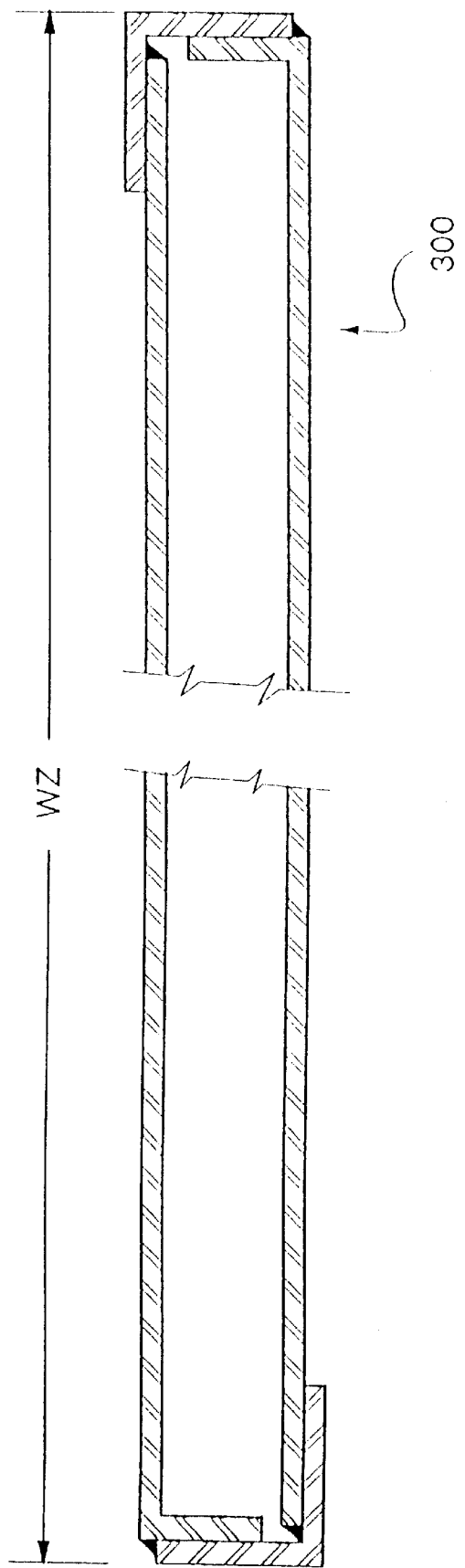
Figure 8C:
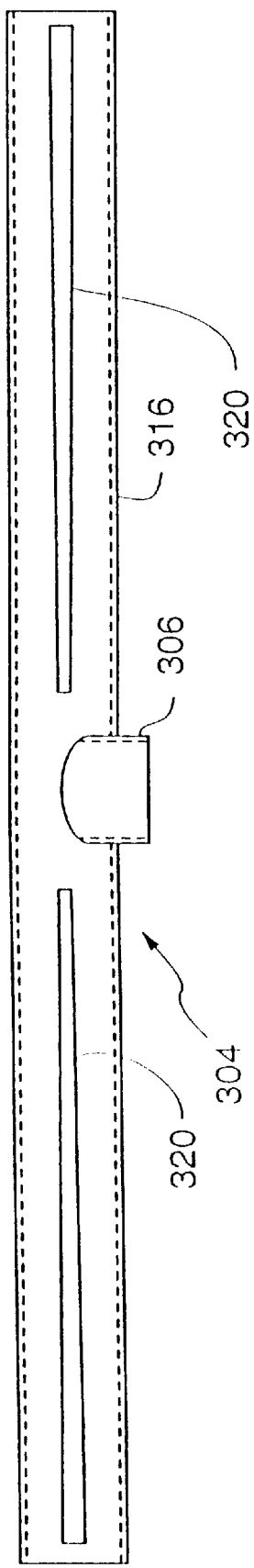
Figure 8D:
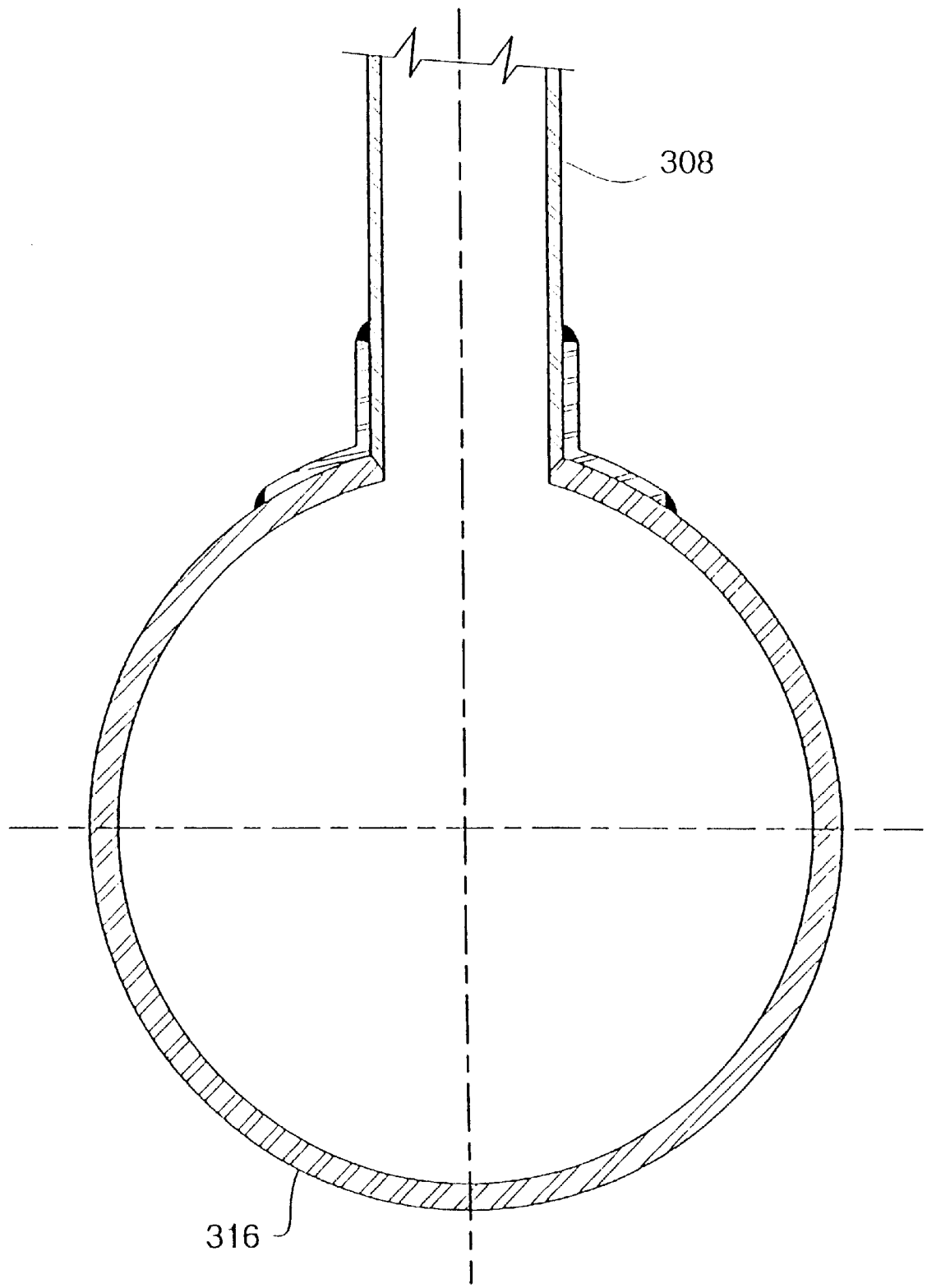

In a third embodiment shown in FIG. 5, the water treatment system includes the components of the preferred and second embodiments as well as a flotation system and secondary gravity separation device. In one aspect of the third embodiment, the flotation system includes both an induced air flotation device 180 and a dissolved air flotation device 184.

This embodiment is particularly useful for applications requiring a purified water stream 188 having an extremely low solids content. Examples of such applications are dredged slurries containing environmentally harmful or toxic solid contaminants. The purified water stream 188 has an extremely low solids content, preferably no more than about 0.5% by weight solids and more preferably no more than about 0.25% by weight solids and most preferably no more than about 0.10% by weight solids.

The induced air flotation or dissolved air flotation devices 180, 184 can be any suitable devices. It is preferred that the DAVIS HI-EFFICIENCY and DAVIS HI-RATE DAF be used for the induced air flotation device 180 and dissolved air flotation device 184, respectively.

The secondary gravity separation device can be any suitable cyclone or centrifuge. The preferred gravity separation device is the SHARPLES CENTRIFUGE provided by DERRICK EQUIPMENT COMPANY.

The operation of the third embodiment is the same as the preferred and second embodiments with the following exceptions. The treated water stream 170 is split into five fractions, with one fraction being the purified water stream 188, another the induced air flotation feedstream 192, another the dissolved air flotation feedstream 196, another the secondary gravity separation feedstream 200 and another the tracking screen recycle stream 138. The amount of the treated water stream that goes to each fraction is a function of the level of turbidity acceptable and the solids characteristics. For example, a drinking water supply application may require that high purity water be produced, thus benefitting from the use of induced air or dissolved air flotation; an application with high density solid particles may benefit from the use of gravity separation methods which are effective for high density particle separation.

The induced air flotation and dissolved air flotation feedstreams 192, 196 can be contacted with a coagulant and/or flocculent 204 to improve the floatability of the solids. The flocculent 130 will also assist flotation but a significant fraction of the flocculent is generally removed with the oversized tracking fraction 166. The preferred coagulants can be the same as the preferred flocculents noted above. Although the amount of coagulant 204 contacted with the feedstreams 192, 196 depends upon the feedstreams' characteristics, it is preferred that the amount be less than about 0.05% by weight and more preferably range from about 0.005 to about 0.05% by weight and most preferably range from about 0.005 to about 0.0% by weight. An in-line mixer (not shown) can be employed to mix the coagulant 204 with the feedstreams.

The induced air flotation feedstream 192 is aerated to produce an induced air flotation froth fraction 208 and an induced air flotation water product 212. The induced air flotation froth fraction 208 is treated by the secondary gravity separation device 216 as discussed below.

The induced air flotation water product 212 along with the dissolved air flotation feedstream 196 and recycle flotation stream 220 are aerated to produce a dissolved air flotation froth fraction 224 and dissolved air flotation water product 228. Like the induced air flotation froth fraction 208, the dissolved air flotation froth fraction is treated by the secondary gravity separation device 216 as discussed below. The recycle flotation stream 220 is a split of the dissolved air flotation water product 228 that is used to reclaim aerated water, reduce air compressor energy requirements, and control slurry density.

The induced air flotation and dissolved air flotation froth fractions 208, 224 and secondary gravity separation feedstream 200 are combined with a flocculent 130 and gravity separated into a gravity separation water product 232 and a gravity separation solids product 236. The gravity separation water product is combined with the dissolved air flotation water product 228 and treated water stream 170 to form the purified water stream 188.

Alternatively, the induced air flotation and dissolved air flotation steps can be sequential with the induced air flotation product 212 being equivalent to the dissolved air flotation feedstream 196. In FIG. 5, the induced air flotation and dissolved air flotation steps are depicted as being partially sequential and singular. The desired configuration will depend upon the application.

As shown by the various embodiments above, the present invention can include any number and types of components arranged in a variety of configurations depending upon the characteristics of the sediments and the dewatered solids product and treated water stream to be produced. The scalping screen can be used to separate and dewater larger particles, vibratory shaker screens to separate and dewater medium size particles, gravity separation devices to separate and dewater denser medium- and fine-sized particles, tracking screens to remove and dewater flocculated agglomerates, dissolved air and/or induced air flotation to remove any remaining solids from the treated water stream, and a secondary gravity separation device to dewater solids in the dissolved air flotation froth fraction and induced air flotation froth fraction.

In an alternative embodiment, the tracking screen 70 employs a vertical slot feeder (rather than the horizontal weirs of FIGS. 3A and 3B) and an in-line mixer to form the flocculated feedstream 96 and feed the flocculated feedstream 96 to the tracking screens 70. Referring to FIGS. 6–7 and 8A–8D, the vertical slot feeder 300 includes an inlet assembly 304 at the lower end of the feeder, a vertical mixing zone 308 in the middle portion of the feeder, and an outlet assembly 312 at the upper end of the feeder. The inlet assembly 304 includes an inlet conduit 306 attached to a slotted conduit 316 with both sides of the slots 320 being tapered towards the inlet conduit 306. The inlet conduit 306 has a diameter sufficient to provide a feedstream velocity through the inlet conduit preferably ranging from about 2.0 to about 10.0 fps. The tapering of the slot in a direction that is countercurrent to the direction of flow of the flocculated feedstream 96 causes the rate of flow of the feedstream to be substantially uniform along the length of the slot. As will be appreciated, the velocity of the feed stream progressively decreases as one moves outwardly along the slot but the cross-sectional area of flow increases, thereby providing a uniform rate of flow along the slot length. The angle of taper of each side of the slot 320 preferably ranges from about 0.2 to about 0.8 and more preferably ranges from about 0.4 to about 0.6 degrees. The slots vary in width from about 1 to about 1.5 inches at the outer end to about ⅜ to about ¾ inch at the inner end. The height ("H") of the vertical mixing zone is sufficient for a residence time in the vertical mixing zone preferably ranging from about 4 to about 7 seconds. The width ("WZ") of the vertical mixing zone is preferably the same as the width ("WS") of the tracking screens 70. The length and width (i.e., cross-sectional area) of the mixing zone are selected to provide a vertical velocity in the mixing zone that is preferably no more than about 2.5 fps, more preferably no more than about 1.5 fps, and most preferably no more than about 1.0 fps. At the upper end of the vertical slot feeder 300, the outlet assembly 312 includes a weir 322 formed by the top of the vertical mixing zone 308, a channel 326 on either side of the mixing zone 308, and a lip 328 at the outer end of each channel 326. The weir 322 transitions the flow of the tracking feed stream 96 from being substantially vertical in the mixing zone 308 to being substantially horizontal in the channel 326. To substantially minimize the kinetic energy of the tracking feed stream 96 when contacting the tracking screen, the channel 326 is only slightly declined from the horizontal. The angle of decline is preferably no more than about 5°, more preferably no more than about 3°, and more preferably ranges from about 1 to about 2°. The lip 328 transitions the flow of the tracking feed stream from the channel 326 to the tracking screen and substantially minimizes the vertical distance over which the tracking feed stream falls from the lip to contact the tracking screens.

The design of the vertical mixing zone is based on the recognition that during the introduction of the flocculated feedstream 96 to the tracking screens 70, it is important that the velocity of the feedstream be substantially minimized to inhibit shearing and comminution of the floccules (i.e., flocculated particles). To realize this result, the outlet assembly 312 at the upper end of the vertical mixing zone is configured such that the flocculated feedstream 96 has small vertical and horizontal velocity components when the feedstream 96 contacts the tracking screens immediately after leaving the lip 328. The velocity of the feedstream has three components: (i) the vertical velocity component measured along a vertical axis 327$b$; (ii) the horizontal velocity component measured along a horizontal axis 327$a$; and (iii) the lateral velocity component measured along a lateral axis 327$c$ (which is normal to the plane of the page). Preferably the vertical velocity component upon contact of the feedstream 96 with the upper tracking screen is less than about 15 fps, more preferably less than about 10 fps, and most preferably less than about 5 fps. Preferably, the horizontal velocity component upon contact of the feedstream 96 with the tracking screen is no more than about 5 fps, more preferably no more than about 3 fps and most preferably no more than about 1 fps. Preferably, the lateral velocity component upon contact of the feedstream with the tracking screen is no more than about 0.5 fps and more preferably no more than about 0.01 fps.

The vertical in-line mixer assembly 400 is mounted on the inlet conduit 306 to the vertical slot feeder 300 to provide a high degree of mixing of the flocculent with the tracking screen feedstream 96. The in-line mixer assembly 400 is oriented substantially vertically to substantially optimize the effects of gravity on feedstream flow during mixing.

The vertical in-line mixer assembly 400 includes an input 404 for the tracking screen feedstream 96, a flocculent addition assembly 408 having a first flocculent input 412 (via flocculent feedline 416) and the vertical in-line mixer 420. The vertical in-line mixer 420 includes an in-line mixing zone 424, a second flocculent input 428 (via flocculent feedline 432) in communication with the mixing zone 424, a mixer motor assembly 436 (which includes the motor 440 and mixing shaft 444 having various mixing propellers and impellers (not shown)), and an output 448 to the vertical slot feeder 300.

The interior cross-section of the in-line mixing zone can be any shape with square or rectangular being most preferred as shown in FIG. 9C. Angular shaped mixing zones simulate a baffled mix tank and thereby prevent slurry vortexing, loss of turbulence, and near-laminar flow common in round pipe mixers.

The mixer motor assembly 436 provides a high degree of mixing efficiency. The configuration of the mixing propellers vary along the length of the mixing shaft to provide a high degree of turbulence in the feedstream. Turbine propellers are located at or below the "T" input 452 and bottom (i.e., below the second flocculent input 428) of the mixing shaft. The turbine propellers are from about 4 to about 5.5 inches and optimally about 5.0 inches in diameter, have a blade height ranging from about 1 to about 10 inches with about 6 inches being the most preferred, and have a pitch of no more than about 45°. An axial flow propeller is positioned in the central portion of the shaft between the sets of turbine propellers. The axial flow propellers are from about 4 to about 5.5 inches and optimally about 5.0 inches in diameter, having a blade height ranging from about 1 to 3 inches with about 2 inch being the most preferred, and have a pitch ranging from about 30 to about 60°. FIGS. 10A and 10B depict the turbine propeller 400 and the axial flow propeller 410. As will be appreciated, the "T" shape of the vertical in-line mixer, square or rectangular mixing zone, and the propellers on the mixing shaft collectively induce a high degree of turbulence in the tracking screen feedstream 96 with minimal shear and thereby provides a high mixing efficiency. The mixing shaft 444 preferably has a speed ranging from about 20 to about 500 rpm and most preferably from about 50 to about 500 rpm.

The motor and mixing shaft can be any suitable equipment, such as the tank mixer manufactured by "GROVHAC, INC." that includes a 1/3 HP, DC motor, SCR motor speed control, gearbox to provide 20 to 300 rpm, stuffing box (shaft packing), 1-inch by 36-inch stainless steel shaft and 6-inch, 150-lb SS304 flange.

The use of differing propeller configurations along the length of the mixing shaft coupled with the DC motor provides several performance advantages. The DC motor permits reversal of the normal direction of the mixing shaft. Reversing the rotation of a turbine propeller has no effect on performance, but reversal of an axial flow propeller's rotation causes a reversal in propeller pumping direction. In this application, rotation reversal would provide an optional, highly energetic mixing regime within the mixing zone. That option combined with the ability to add, subtract, and alter the configuration of the propellers results in a highly flexible overall system.

Flocculent addition is realized through multiple ports, e.g., the first and second flocculent inputs 412, 428. The primary (and largest by volume) flocculent injection occurs through the first flocculent input 412 and is fed directly into the tracking feedstream 96 immediately prior to its entering the mixing zone. The second flocculent input 428 adds additional flocculent to "trim" the primary flocculent addition. For best results, from about 75 to about 95% of the flocculent is added at the first flocculent input 412 and the remainder at the second flocculent input 428. The flocculent is preferably added continuously at the first and second flocculent inputs to aid in the formation of stable floccules.

In operation, the tracking screen feedstream 96 is first introduced into the in-line mixer assembly via the input 404. The tracking screen feedstream 96 is contacted with flocculent introduced at the first flocculent input 412 and flows into the in-line mixing zone 424. The turbine propellers at the upper end of the mixing shaft and the impellers thoroughly mix the flocculent and the tracking screen feedstream. The tracking screen feedstream 96 is contacted with additional flocculent from the second flocculent input 428 and mixed together via the turbine propellers at the lower end of the mixing shaft.

The tracking screen feedstream is next introduced into the vertical slot feeder 300 via the output 448. The tracking screen feedstream 96 flows from the input conduit 306, through the slots in the slotted conduit 320 in the slotted conduit 316 and into the vertical mixing zone. In the vertical mixing zone 308, the tracking screen feedstream 96 and flocculent continues to mix and flow upward to the outlet assembly 312 of the vertical mixing zone. The tracking screen feedstream 96 flows from the vertical mixing zone 308 in a substantially vertical direction, horizontal weirs 322 onto the channels 326 and thereby causes the feedstream 96 to transition from flow in the vertical direction to the horizontal direction in the channel 326. The tracking screen feedstream 96 flows through the channel 326, over the lip 328, and onto the upper end of the tracking screen. At the point of contacting the tracking screen, the floccules obtain a velocity component parallel to the plane of the tracking screens with a very low vertical velocity component as noted above.

Yet another embodiment of the vertical in-line mixing assembly and a riser assembly 600 are depicted in FIGS. 12–15. The vertical in-line mixing assembly 500 utilizes a novel blade design to achieve superior mixing while the riser assembly 600 eliminates the slotted conduit 316 of the vertical slot feeder and utilizes a trapezohedral profile to control the velocities of the floccules in the vertical mixing zone.

Figure 12:
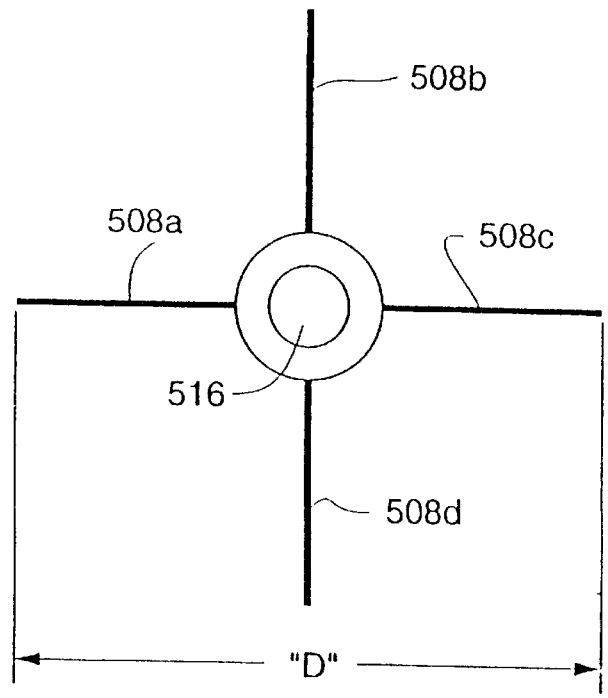
FIGS. 12–13 depict various views of the mixing blades in the in-line mixing device.
Figure 13:
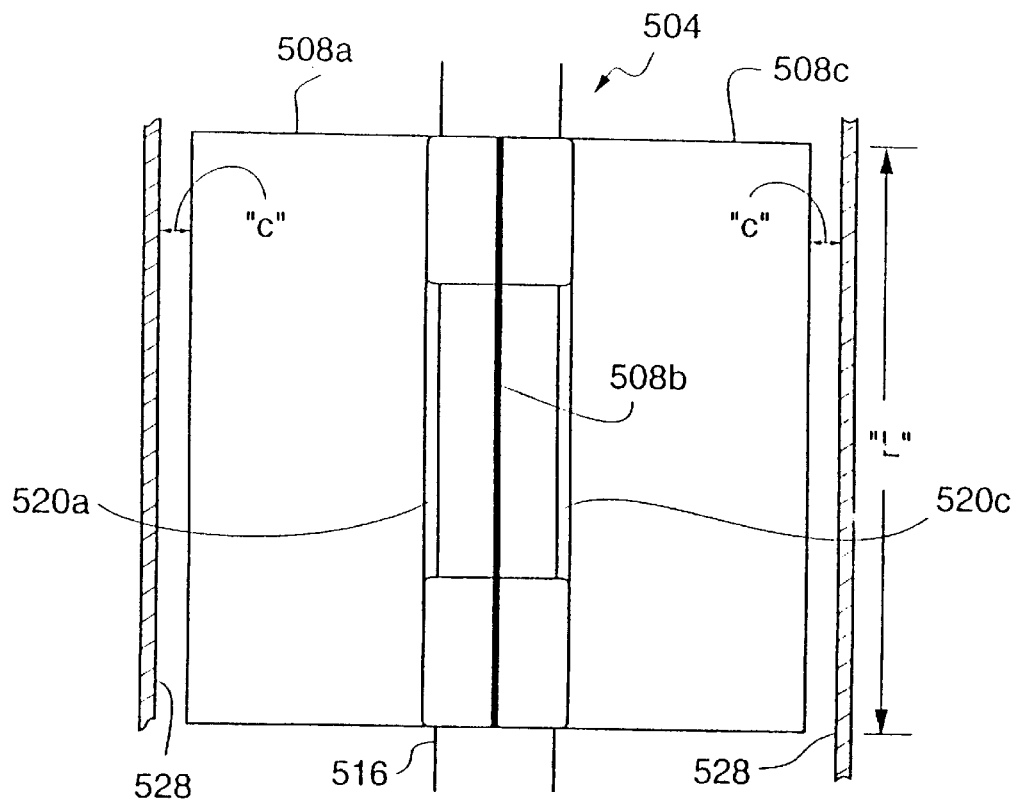

Referring to FIGS. 12 and 13, the mixing blade assembly 504 includes a plurality of mixing blades 508*a–d* attached to a plurality of hubs 512*a,b* mounted on the motor shaft 516. A space 520*a–d* separates each of the blades from the shaft. The clearance "c" of the ends 524*a–d* of the blades and the interior surface 528 of the in-line mixing housing 532 is preferably no more than about 1 inch, more preferably no more than about 0.5 inches, and most preferably ranges from about 0.2 to about 0.3 inches. The length "L" of each blade preferably ranges from about 1 to about 8, more preferably from about 2 to about 7, and most preferably from about 4 to about 6 inches. The diameter "D" of the mixing blades preferably ranges from about 4 to about 5.5 inches.

Figure 14:
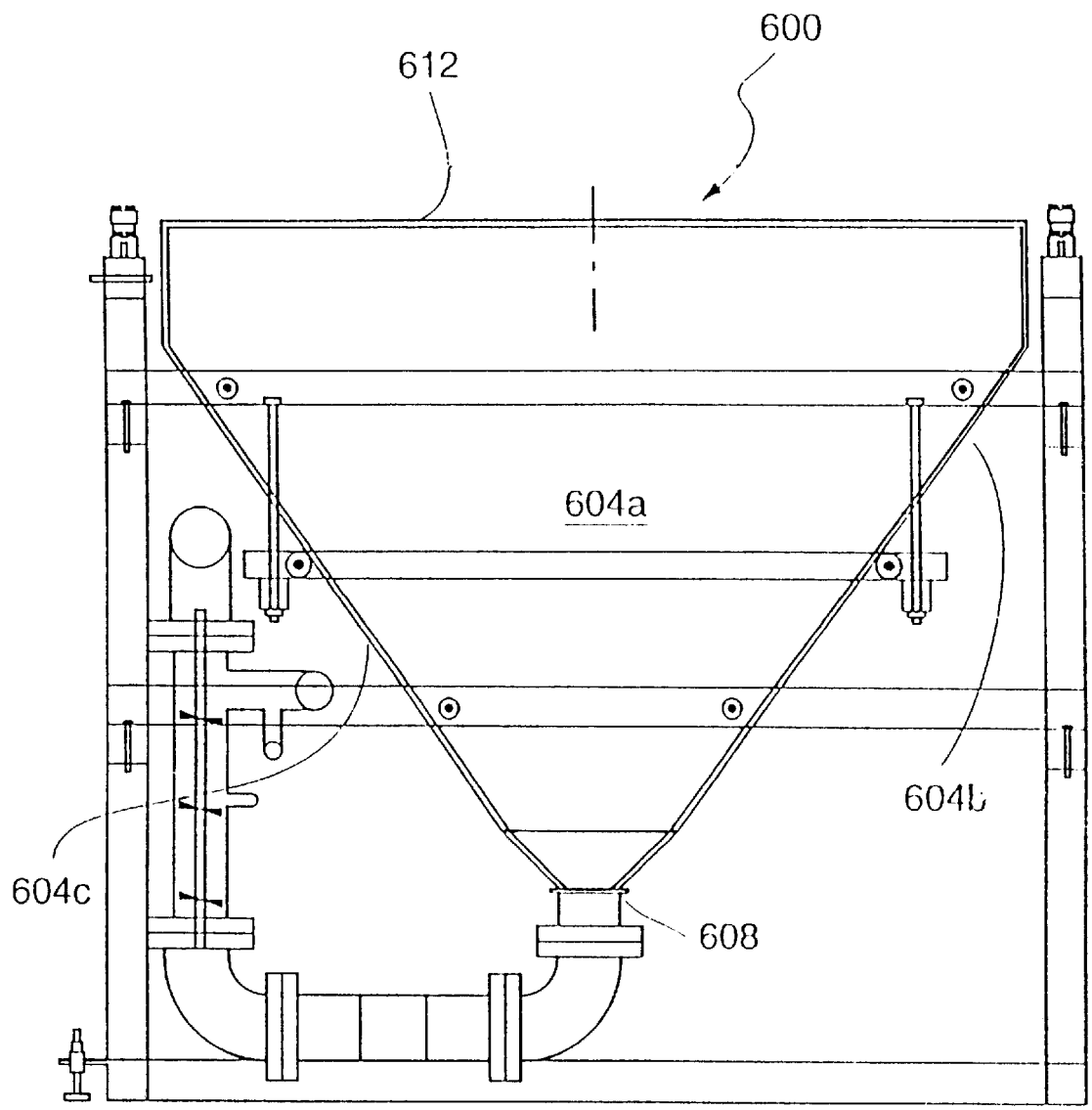
FIGS. 14–15 depict various views of an alternative embodiment of the riser assembly.
Figure 15:
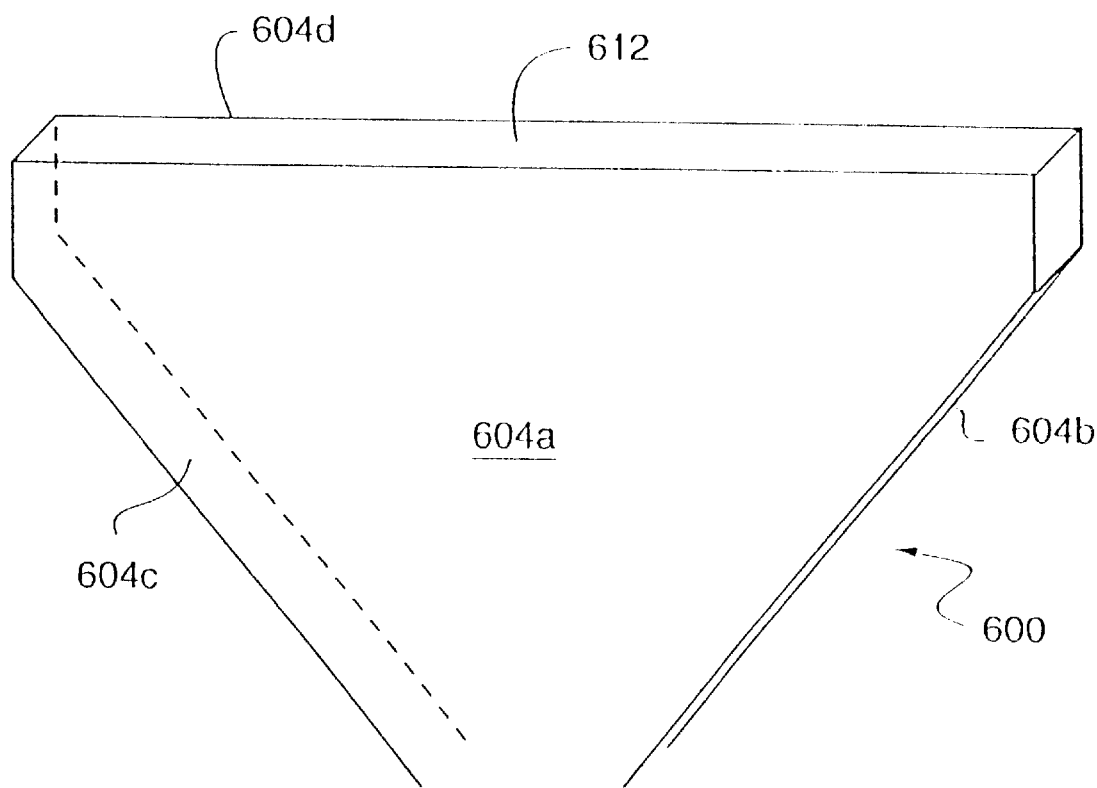

Referring to FIGS. 14–15, the riser assembly 600 includes a plurality of walls 604*a–d* providing a vertical velocity gradient for the floccules with the highest velocity being at the input end 608 of the riser assembly 600 and the lowest velocity being at the output end 612 of the riser assembly 600. The velocity gradient substantially inhibits back-settling of floccules. As shown in FIG. 15, the velocity gradient is provided by sloping walls 604*b,c* providing an increasing horizontal cross-sectional area of flow as the floccules move from the input end towards the output end of the riser. Preferably, the horizontal cross-sectional area of the riser's input end 608 is no more than about 25% of the horizontal cross-sectional area of the riser's output end 612. Preferably, the vertical velocity of the floccules in the riser's input end 608 ranges from about 2.0 to about 10.0 fps and the velocity in the riser's output end 612 ranges from about 0.5 to about 1.5 fps.

To further control the velocity of the floccules in the riser, the riser can include a second inlet (not shown) into the input end of the riser for a recycle stream of the treated water stream 10. The recycled stream can be introduced into the riser at a selected flowrate to yield a selected velocity of the floccules. As will be appreciated, the flowrate of the recycled stream into the riser assembly is directly related to the floccule velocity provided that the flowrate of the slurry into the riser assembly is substantially constant. A control feedback loop can be included to alter the floccule velocity in the riser assembly based upon a number of parameters, such as the solids content of the treated water stream.

EXPERIMENT 1

The system of the third embodiment was modeled on a dredged slurry feed having the characteristics shown in Table 1 below. The gravity separation device was a cyclone, and the secondary gravity separation device was a centrifuge.

TABLE 1

| FEED CHARACTERISTICS | | | | | | | |
|---|---|---|---|---|---|---|---|
| Dredge Output | 1200 gpm | | 20.00% dry solids by weight | | | | |
| Particle Size, mm maximum − | | 12.700 | 1.651 | 0.104 | 0.053 | 0.038 | Total |
| Particle Size, mm minimum + | 12.700 | 1.651 | 0.104 | 0.053 | 0.038 | −0.038 | |

TABLE 1-continued

FEED CHARACTERISTICS

| Dredge Output | 1200 gpm | | | 20.00% dry solids by weight | | |
|---|---|---|---|---|---|---|
| Process Unit | Scalping | Rundown | Shakers | Cyclones | Cyclone Screen | Tracking Screen |
| Screen Size, Tyler Standard Sieve Series | | 10 | 150 | 270 | 400 | −0.038 |
| Solids Density, Dry lb/cf | 80.00 | 95.00 | 100.00 | 105.00 | 70.00 | 65.00 | 82.47 |
| Dry Solids Distribution, wt % | 2.00% | 5.00% | 25.00% | 20.00% | 40.00% | 8.00% | 100.00% |
| Dry Solids in Feed, wt % of total feed | 0.40% | 1.00% | 5.00% | 4.00% | 8.00% | 1.60% | 20.00% |
| Dry Solids in Feed, vol % of total feed | 0.31% | 0.66% | 3.18% | 2.42% | 7.19% | 1.54% | 15.91% |

The screen sizes of the scalping screen 58, rundown screen 62, shaker screen 66, gravity separation device screen 154, and tracking screen 70 and other process characteristics are shown in Table 2 below. The process flow summary is presented in Tables 3–5 below.

TABLE 2

PROCESS CHARACTERISTICS
Flocculent to Tracking Screen

Feed Stream Cut, Dry wt % Feed Solids to Product Solids

| | Screen Size | | | | | | Cyclone | Tracking | wt % Solids |
|---|---|---|---|---|---|---|---|---|---|
| Process Unit | Tyler No | mm | Scalping | Rundown | Shakers | Cyclones | Screen | Screen | in Product |
| Scalping Screen | | 12.700 | 100.0% | 1.00% | 0.00% | 0.00% | 0.00% | 0.00% | 95.00% |
| Rundown Screen | 10 | 1.651 | 100.00% | 100.00% | 3.00% | 2.00% | 1.00% | 1.00% | 80.00% |
| Shaker Screen | 150 | 0.105 | 100.00% | 100.00% | 100.00% | 10.00% | 5.00% | 2.00% | 70.00% |
| Cyclones | | | 100.00% | 100.00% | 100.00% | 75.00% | 10.00% | 5.00% | 55.00% |
| Cyclone Screen | 270 | 0.053 | 100.00% | 100.00% | 100.00% | 100.00% | 10.00% | 5.00% | 75.00% |
| Tracking Screen | Avg % Eff-50.00% | 0.038 | 50.00% | 50.00% | 50.00% | 50.00% | 50.00% | 50.00% | 60.00% |
| Induced Air Flotation (IAF) | 80.00% | | 80.00% | 80.00% | 80.00% | 80.00% | 80.00% | 80.00% | 40.00% |
| Dissolved Air Flotation (DAF) | 85.00% | | 85.00% | 85.00% | 85.00% | 85.00% | 85.00% | 85.00% | 40.00% |
| Centrifuge | 90.00% | | 90.00% | 90.00% | 90.00% | 90.00% | 90.00% | 90.00% | 60.00% |

Distribution of Tracking Screen (70) Undersized Fraction
0.0% to Purified Water (188)                30.0% of DAF Product
90.0% to IAF Feedstream (192)
10.0% to Recycle (138)
0.0% to DAF Feedstream (198)
0.0% to Secondary Gravity Separation Feedstream (200)

TABLE 3

PROCESS FLOW SUMMARY

| | | | Solids Flow (dry lb/hr) by Size Fraction, maximum size in mm | | | | | |
|---|---|---|---|---|---|---|---|---|
| Unit Operation | Stream No. and Product | Screen Opening mm | 12.7 | 12.7 1.651 | 1.651 0.104 | 0.104 0.053 | 0.053 0.038 | 0.038 |
| Dredge | 54 | Slurry | | 2525 | 6314 | 31568 | 25255 | 50509 | 10102 |
| Scalping Screen | 114 | OS | 12.700 | 2525 | 63 | 0 | 0 | 0 | 0 |
| | 110 | US | | 0 | 6251 | 31568 | 25255 | 50509 | 10102 |
| Rundown Screen | 118 | OS | 1.651 | 0 | 6251 | 947 | 505 | 505 | 101 |
| | 122 | US | | 0 | 0 | 30621 | 24750 | 50004 | 10001 |

TABLE 3-continued

PROCESS FLOW SUMMARY

|  |  |  | Solids Flow (dry lb/hr) by Size Fraction, maximum size in mm | | | | | |
|---|---|---|---|---|---|---|---|---|
| Unit Operation | Stream No. and Product | | Screen Opening mm | 12.7 | 12.7 1.651 | 1.651 0.104 | 0.104 0.053 | 0.053 0.038 | 0.038 |

| Unit Operation | Stream No. and Product | | Screen Opening mm | 12.7 | 12.7–1.651 | 1.651–0.104 | 0.104–0.053 | 0.053–0.038 | 0.038 |
|---|---|---|---|---|---|---|---|---|---|
| Shaker Screen (Flowline) | 126 | OS | 0.104 | 0 | 0 | 30621 | 2475 | 2500 | 200 |
|  | 78 | US |  | 0 | 0 | 0 | 22275 | 47504 | 9001 |
| Cyclone (High G) | 150 | OS |  | 0 | 0 | 0 | 16706 | 4750 | 490 |
|  | 154 | OF |  | 0 | 0 | 0 | 5569 | 42754 | 9311 |
| Cyclone Screen | 158 | OS | 0.053 | 0 | 0 | 0 | 16706 | 475 | 25 |
|  | 162 | US |  | 0 | 0 | 0 | 0 | 4275 | 466 |
| Tracking Screen | 166 | OS | 0.038 | 0 | 0 | 0 | 2784 | 23515 | 4888 |
| 10.0% to Recycle | 138 | US |  | 0 | 0 | 0 | 309 | 2613 | 543 |
| 0.0% to Recov Water | 188 | US |  | 0 | 0 | 0 | 0 | 0 | 0 |
| 90.0% to IAF | 192 | US |  | 0 | 0 | 0 | 2784 | 23515 | 4888 |
| 0.0% to DAF | 196 | US |  | 0 | 0 | 0 | 0 | 0 | 0 |
| 0.0% to Centrifuge | 200 | US |  | 0 | 0 | 0 | 0 | 0 | 0 |
| Induced Air Flotation (IAF) | 208 | FS |  | 0 | 0 | 0 | 2227 | 18812 | 3911 |
|  | 212 | UF |  | 0 | 0 | 0 | 557 | 4703 | 978 |
| Dissolved Air Flotation (DAF) | 224 | FS |  | 0 | 0 | 0 | 473 | 3997 | 831 |
|  | 228 | UF |  | 0 | 0 | 0 | 119 | 1008 | 209 |
|  | 220 | RC |  | 0 | 0 | 0 | 36 | 302 | 63 |
|  |  | Water |  | 0 | 0 | 0 | 84 | 705 | 147 |
| Centrifuge | 236 | Sludge |  | 0 | 0 | 0 | 2431 | 20528 | 4267 |
|  | 232 | Water |  | 0 | 0 | 0 | 270 | 2281 | 474 |
| Purified Water | 188 | Water |  | 0 | 0 | 0 | 354 | 2986 | 621 |
| Solids Product |  | Solids |  | 2525 | 6314 | 31568 | 24901 | 47523 | 9481 |
| Totals |  |  |  | 2525 | 6314 | 31568 | 25255 | 50509 | 10102 |

1072 gpm flow and 11.48% solids in combined Tracking Screen Feed (Streams 150, 162)
1180 gpm flow and 11.01% solids in combined Tracking Screen feed and recycle (Streams 138, 150, 162)

TABLE 4

STREAM FLOWS BY WEIGHT

| Unit Operation | Stream No. and Product | | Solids Flow dry lb/hr | Solids Removed cum lb/hr | Solids Content dry wt % | Total Flow lb/hr | Water Flow lb/hr |
|---|---|---|---|---|---|---|---|
| Dredge | 54 | Slurry | 126274 |  | 20.02% | 630626 | 504353 |
| Scalping Screen | 114 | OS | 2589 | 2589 | 95.00% | 2725 | 136 |
|  | 110 | US | 123685 |  | 19.70% | 627901 | 504217 |
| Rundown Screen | 118 | OS | 8309 | 10897 | 80.00% | 10386 | 2077 |
|  | 122 | US | 115376 |  | 18.68% | 617515 | 502139 |
| Shaker Screen (Flowline) | 126 | OS | 35797 | 46694 | 70.00% | 51138 | 15341 |
|  | 78 | US | 79580 |  | 14.50% | 566378 | 486798 |
| Cyclone (High-G) | 150 | UF | 21946 |  | 55.00% | 39903 | 17956 |
|  | 154 | OF | 57633 |  | 10.95% | 526475 | 468842 |
| Cyclone Screen | 158 | US | 17206 | 63899 | 75.00% | 22941 | 5735 |
|  | 162 | OS | 4741 |  | 27.95% | 16962 | 12221 |
| Tracking Screen | 166 | OS | 31187 | 95086.5 | 60.00% | 51978 | 20791 |
| 10.0% to Recycle | 138 | US | 3465 |  | 6.35% | 54606 | 51141 |
| 0.0% to Purif Water | 188 | US | 0 |  | NA | 0 | 0 |
| 90.0% to IAF | 192 | US | 31187 |  | 6.35% | 491458 | 460271 |
| 0.0% to DAF | 196 | US | 0 |  | NA | 0 | 0 |
| 0.0% to Centrifuge | 200 | US | 0 |  | NA | 0 | 0 |
| Induced Air Flotation (IAF) | 208 | FS | 24950 |  | 40.00% | 62374 | 37424 |
|  | 212 | UF | 6237 |  | 1.45% | 429084 | 422847 |
| Dissolved Air Flotation (DAF) | 224 | FS | 5302 |  | 40.00% | 13254 | 7953 |
|  | 228 | UF | 1337 |  | 0.2250% | 594943 | 592706 |
|  | 220 | RC | 401 |  | 0.2250% | 178213 | 177812 |
|  |  | Water | 936 |  | 0.2250% | 415830 | 414894 |
| Centrifuge | 236 | Sludge | 27226 | 122313 | 60.00% | 45377 | 18151 |
|  | 232 | Water | 3025 |  | 10.0000% | 30251 | 27226 |
| Purified Water | 188 | Water | 3961 | 3.14% | 0.8879% | 446081 | 442121 |
| Solids Product |  | Solids | 122313 | 96.86% | 66.2780% | 184545 | 62232 |
| Totals |  |  | 126274 | 100.00% | 20.0235% | 630626 | 504353 |

TABLE 5

STREAM FLOWS BY VOLUME

| Unit Operation | Stream No. and Product | | Solids Density dry lb/cf | Solids Flow cum lb/hr | Solids Flow cf/cr | Solids Removed cum cy/cr | Solids Flow gpm | Water Flow gpm | Total Flow gpm |
|---|---|---|---|---|---|---|---|---|---|
| Dredge | 54 | Slurry | 82.5 | 1531.21 | 58.71 | | 190.89 | 1009.1 | 1200.0 |
| Scalping Screen | 114 | OS | 80.3 | 32.23 | 1.19 | 1.19 | 4.02 | 0.3 | 4.3 |
| | 110 | US | 82.5 | 1498.98 | 55.52 | | 186.87 | 1008.8 | 1195.7 |
| Rundown Screen | 118 | OS | 93.5 | 88.85 | 3.29 | 4.48 | 11.08 | 4.2 | 15.2 |
| | 122 | US | 81.8 | 1410.13 | 52.23 | | 175.80 | 1004.7 | 1180.5 |
| Shaker Screen (Flowline) | 126 | OS | 97.1 | 368.58 | 13.65 | 18.14 | 45.95 | 30.7 | 76.6 |
| | 78 | US | 76.4 | 1041.55 | 38.58 | | 129.95 | 974.0 | 1103.8 |
| Cyclone (High-G) | 150 | UF | 93.6 | 234.51 | 8.69 | | 29.24 | 35.9 | 65.2 |
| | 154 | UF | 71.4 | 807.05 | 29.89 | | 100.81 | 938.1 | 1038.7 |
| Cyclone Screen | 158 | US | 103.5 | 166.27 | 6.16 | 24.29 | 20.73 | 11.5 | 32.2 |
| | 162 | OS | 89.5 | 68.24 | 2.53 | | 8.51 | 24.5 | 33.0 |
| Tracking Screen | 166 | OS | 71.3 | 437.64 | 16.21 | 40.50 | 54.56 | 41.6 | 96.2 |
| 10.0% to Recycle | 138 | US | 71.3 | 48.63 | 1.80 | | 6.06 | 102.3 | 108.4 |
| 0.0% to Recov Water | 188 | US | NA | NA | 0.00 | | 0.00 | 0.0 | 0.0 |
| 90.0% to IAF | 192 | US | 71.3 | 437.64 | 16.21 | | 54.56 | 920.9 | 975.5 |
| 0.0% to DAF | 196 | US | NA | NA | 0.00 | | 0.00 | 0.0 | 0.0 |
| 0.0% to Centrifuge | 200 | US | NA | NA | 0.00 | | 0.00 | 0.0 | 0.0 |
| Induced Air Flotation (IAF) | 208 | FS | 71.3 | 350.11 | 12.97 | | 43.65 | 74.9 | 118.5 |
| | 212 | UF | 71.3 | 87.53 | 3.24 | | 10.91 | 846.0 | 856.9 |
| Dissolved Air Flotation (DAF) | 224 | FS | 71.3 | 74.4 | 2.76 | | 9.28 | 15.9 | 25.2 |
| | 228 | UF | 71.3 | 18.76 | 0.69 | | 2.34 | 1185.9 | 1188.2 |
| | 220 | RC | 71.3 | 5.63 | 0.21 | | 0.70 | 355.8 | 358.5 |
| | | Water | 71.3 | 13.13 | 0.49 | | 1.64 | 830.1 | 831.8 |
| Centrifuge | 236 | Sludge | 71.3 | 382.06 | 14.15 | 54.65 | 47.63 | 36.3 | 83.9 |
| | 232 | Water | 71.3 | 42.45 | 1.57 | | 5.29 | 54.5 | 59.8 |
| Purified Water | 188 | Water | 71.3 | 55.58 | 2.06 | 3.63% | 6.93 | 884.6 | 891.5 |
| Solids Product | | Solids | 82.9 | 1475.63 | 54.65 | 96.37% | 163.96 | 124.5 | 308.5 |
| Totals | | | 82.5 | 1531.21 | 56.71 | 100.00% | 190.89 | 1009.1 | 1200.0 |

857 gpm flow and 1.45% solids in combined DAF feed (Streams 196, 212)
8879 ppm solids in purified water
1213 gpm flow and 1.09% solids in combined DAF feed and recycle (Streams 196, 212 and 220)

As can be seen from the various Tables, the process of FIG. 5 effectively reduces the solids content of the purified water stream 188 to 8879 ppm at relatively high system throughput rates (i.e., 1200 gpm). Accordingly, the present invention is capable of providing a purified water stream having significantly lower solids content at a significantly higher throughput rate than existing dredging operations.

EXPERIMENT 2

A number of feed slurry flocculation tests were conducted utilizing the tracking screen a dredged slurry from a small lake. The flocculent was an anionic emulsion polymer sold under the trademark "GREATFLOC 5054". The flocculent addition rate was calculated from laboratory data, slurry flowrate and pulp density. Slurry flowrate was measured by a paddle wheel sensor located at the inlet point, and by a weir immediately preceding the upper weir tube. The sensor was subject to failure when filamentous debris wrapped around the paddle wheel shaft, inhibiting rotation. Measurement of flow height over the weir therefore became the sole method of flow rate measurement. Pulp density was measured using a Marcy scale; samples were obtained at the feed inlet.

Flocculent was prepared using a two-stage dilution procedure. A liquid polymer preparation system, consisting of a variable-speed gear pump, calibration tube, water flow meter and in-line static mixer, performed the first dilution. Primary diluted flocculent was held in a 200-gallon tank. Secondary dilution occurred continuously during operation by introduction of primary-diluted flocculent by a variable-speed gear pump, and lake water to a static mixer. Both streams' flowrates were measured by a rotameter.

System start-up used flocculent diluted to 0.5 volume % of the as-received concentration as primary diluted material. The maximum slurry flowrate that could be provided by operations during that period was 250–300 gpm at a pulp density of 5% solids (w/w), well below the design flow and density values of 1200 gpm and 15% solids (w/w). These data indicated a flocculent flowrate (dosage=1.6 lbs/ton) of 5 gpm plus 30 gpm dilution water (target final flocculent concentration=0.5%). When observation disclosed no visible flocculation, the dosage was increased to approximately 2.25 lbs/ton and then to approximately 3.2 lbs/ton. Clear water was observed overflowing the tracking screen feed weirs, indicating that flocculation and separation were occurring in the piping/weir system. Because flocculent flowrate measurement was problematic at the low slurry flowrates and flocculent concentrations employed, two modifications were made. A new batch of primary diluted flocculent was prepared at 0.25% concentration, and the slurry flowrate was increased to approximately 500 gpm. Successful flocculation of solids in the slurry was then realized.

In another run (i.e., Run #2), the slurry flowrate was stabilized at approximately 600 gpm and pulp density was 6.0% solids (w/w). Flocculent dosage was set at 2.0 lbs/ton with a delivered concentration of 0.05%. Approximately 15% (10 gpm) of the total flocculent flowrate was diverted to a second injection point, with the balance injected at the first injection point. Additionally, a vertical baffle, projecting downward below the water level was fitted to the weir tube to moderate wave action induced by the inlet weir overflow cascade.

Floccules successfully formed, separated on the screens, agglomerated, migrated to lower screens, and dewatered. Slurry discharge areas where the flow was gentle and/or laminar showed good accumulations of floccules. Screens under high energy/turbulent areas did not accumulate floccules as well. The results of this test conclusively established that the system was capable of flocculating, separating, and dewatering finely sized particles. Good results were achieved with from about 80 to about 90% of the flocculent directed to the primary injection point with the balance being directed to the secondary injection point.

In another run (i.e., Run #3), the objective was to repeat and maintain the performance observed during Run #2. Slurry flowrate target was about 600 to about 500 gpm and the target flocculent dosage was about 2.0 plus or minus 0.5 lbs/ton. A flocculent was injected at points 1 and 2. The split was varied (from about 70% to about 90% at point 1 and from about 10% to about 30% at point 2) to determine effect.

In another run (i.e., Run #4), the objective was to operate continuously with consistent solids production for an extended period. Additionally, it was desired that injection of flocculent at point 1 only be evaluated.

The results of the various demonstrations are set forth in Tables 6–9 below.

TABLE 6

Average Moisture Content %, by Operation

| Scalping Screen ("SS") | Linear Shakers ("LS") | HI-G Dryer ("HI-G") | Centrifuge ("CENT") | Tracking Screen Overflow |
| --- | --- | --- | --- | --- |
| 21.7% | 15.9% | 24.4% | 29.1% | 64.7% |

TABLE 7

| | Sample Data | | Analysis Aliquot | | Moisture, |
| --- | --- | --- | --- | --- | --- |
| Run | ID | Wet Wt., g | Wet Wt., g | Dry Wt., g | Weight % |
| 1 | SS | 839.8 | 173.58 | 138.02 | 20.5% |
| 1 | LS | 909.0 | 193.15 | 154.28 | 20.1% |
| 1 | HI-G | 964.6 | 151.70 | 117.77 | 22.4% |
| 1 | CENT | 837.6 | 178.12 | 129.21 | 27.5% |
| CALCULATED COMPOSITE | | 3551.0 | 3551.0 | 2749.2 | 22.6% |
| 2 | SS | 761.8 | 265.06 | 200.05 | 24.5% |
| 2 | LS | 793.6 | 247.08 | 207.16 | 16.2% |
| 2 | HI-G | 833.6 | 125.88 | 91.31 | 27.5% |
| 2 | CENT | 634.7 | 154.50 | 104.21 | 32.6% |
| CALCULATED COMPOSITE | | 3023.7 | 3023.7 | 2299.6 | 23.9% |
| 3 | SS | 920.0 | 259.64 | 212.56 | 18.1% |
| 3 | LS | 791.4 | 196.68 | 167.52 | 14.8% |
| 3 | HI-G | 897.1 | 130.05 | 98.29 | 24.4% |
| 3 | CENT | — | — | — | — |
| CALCULATED COMPOSITE | | | | | NR |
| 4 | SS | NM | 296.27 | 226.33 | 23.6% |
| 4 | LS | NM | 224.11 | 196.37 | 12.4% |
| 4 | HI-G | NM | 310.06 | 237.25 | 23.5% |
| 4 | CENT | NM | 321.04 | 233.78 | 27.2% |
| CALCULATED COMPOSITE | | — | 1151.5 | 893.7 | 22.4% |

Moisture content reported on a wet weight basis:
((Wet Wt − Dry Wt) ÷ Wet Wt) × 100 = Weight % Moisture
NM = Not Measured
NR = Not Reported

TABLE 8

COMPOSITE DATA & DISTRIBUTION OF PARTICLE SIZES IN RECOVERED FOOTHILLS GC LAKE SEDIMENTS PRODUCT COMPOSITE DATA

| | Sample ID | Wet Wt., g | % Moisture | Calc. Dry Wt., g | % of Composite |
| --- | --- | --- | --- | --- | --- |
| Scalping Screen Samples | SS Run #1 | 88.6 | 20.5% | 70.4 | 24.7% |
| | SS Run #2 | 97.4 | 24.5% | 73.5 | 25.8% |
| | SS Run #3 | 90.4 | 18.1% | 74.0 | 25.9% |
| | SS Run #3 | 88.3 | 23.6% | 67.5 | 23.6% |
| | SS Computed Total: | 364.7 | | 285.4 | |
| Linear Shaker Samples | LS Run #1 | 79.0 | 20.1% | 63.1 | 23.1% |
| | LS Run #2 | 79.2 | 16.2% | 66.4 | 24.3% |
| | LS Run #3 | 80.4 | 14.8% | 68.5 | 25.1% |
| | LS Run #4 | 85.3 | 12.4% | 74.7 | 27.4% |
| | LS Computed Total: | 323.9 | | 272.7 | |
| HI-G Dryer Samples | HI-G Run #1 | 79.0 | 22.4% | 61.3 | 25.4% |
| | HI-G Run #2 | 79.3 | 27.5% | 57.5 | 23.8% |
| | HI-G Run #3 | 79.5 | 24.4% | 60.1 | 24.9% |
| | HI-G Run #4 | 81.4 | 23.5% | 62.3 | 25.8% |
| | HI-G Computed Total: | 319.2 | | 241.2 | |

TABLE 9

PRODUCT COMPOSITE PARTICLE SIZE ANALYSIS

| | Scalping Screen 24-Mesh | | Linear Shakers 80-Mesh | | High-G 140-Mesh | |
| --- | --- | --- | --- | --- | --- | --- |
| Target Cut: Mesh(Tyler) | Mass, g | %, Direct | Mass, g | %, Direct | Mass, g | %, Direct |
| +10 | 65.6 | 23.5% | | 0.0% | | 0.0% |
| 10 × 35 | 84.7 | 30.4% | | 0.0% | | 0.0% |
| 35 × 65 | | 0.0% | 239.4 | 93.3% | | 0.0% |
| 65 × 100 | 22.5 | 8.1% | 10.8 | 4.2% | 116.1 | 62.9% |
| 100 × 150 | 106.0 | 38.0% | 5.4 | 2.1% | 40.2 | 21.7% |
| 150 × 200 | | 0.0% | 1.0 | 0.4% | 23.1 | 12.5% |
| −200 | | 0.0% | | 0.0% | 5.3 | 2.9% |
| | | 100.0% | | 100.0% | | 100.0% |

Notes:
Three composites were prepared from production samples taken from Runs #1–4. Approximately equal weights of individual samples were used at their as-produced moisture content to generate each composite sample. Each composite was wet-screened at the finest screen size in its respective series. Oversized solids were dried, then dry-screened on a Ro-Tap machine.

EXPERIMENT 3

The system of the third embodiment, excluding the rundown screen, induced air flotation and dissolved air flotation process steps, was modeled on a dredged slurry feed having the characteristics shown in Table 10 below.

TABLE 10

FEED CHARACTERISTICS

| Dredge Output | 1200 gpm | 10.00% dry solids, by weight | | | | | |
|---|---|---|---|---|---|---|---|
| Particle Size, mm maximum − | | 0.701 | NA | 0.175 | NA | 0.104 | |
| Particle Size, mm minimum + | 0.701 | NA | 0.175 | NA | 0.104 | NA | Total |

| Process Unit | Scalping | Rundown | Shakers | Cyclones | Cyclone Screen | Tracking Screen | |
|---|---|---|---|---|---|---|---|
| Screen Size, Tyler Standard Sieve Series | 24 | NA | 80 | NA | 150 | NA | |
| Solids Bulk Density, dry lb/cf | 157 | 143 | 159 | 159 | 157 | 147 | 152.73 |
| Dry Solids Distribution, wt % | 12.50% | 0.00% | 18.90% | 0.00% | 22.40% | 46.20% | 100.00% |
| Dry Solids in Feed, wt % of total feed | 1.25% | 0.00% | 1.89% | 0.00% | 2.24% | 4.62% | 10.00% |
| Dry Solids in Feed, vol % of total feed | 0.50% | 0.00% | 0.75% | 0.00% | 0.90% | 2.01% | 4.34% |

The screen sizes of the scalping screen 58, shaker screen 66, gravity separation device screen 154, tracking screen 70 and other process characteristics are shown in Table 11 below. The process flow summary is presented in Tables 12 through 13 below.

TABLE 11

PROCESS CHARACTERISTICS

| Flocculent to Tracking Screen: | Yes |
|---|---|
| Coagulant to IAF: | NA |
| Coagulant to DAF: | NA |
| Flocculent to Centrifuge: | None |

Feed Stream Cut, Dry wt % Feed Solids to Product Solids

| Process Unit | Screen & Opening Tyler No | mm | Scalping | Rundown | Shakers | Cyclones | Cyclone Screen | Tracking Screen | wt % Solids in Product |
|---|---|---|---|---|---|---|---|---|---|
| Scalping Screen | 24 | 0.701 | 100.0% | 0.00% | 4.00% | 3.00% | 2.00% | 1.0a% | 78.30% |
| Rundown Screen | NA | NA | 100.00% | 0.00% | 0.00% | 0.00% | 0.00% | 0.00% | NA |
| Shaker Screen | 80 | 0.175 | 100.00% | 0.00% | 100.00% | 4.00% | 3.00% | 2.00% | 84.10% |
| Cyclones | NA | NA | 100.00% | 0.00% | 100.00% | 75.00% | 4.00.% | 3.00% | 55.00% |
| Cyclone Screen | 150 | 0.104 | 100.00% | 0.00%. | 100.00% | 10.00% | 100.00% | 4.00% | 75.60% |
| Tracking Screen | Avg % Eff- 85.00% | | 85.00% | 85.00% | 85.00% | 85.00% | 85.00% | 85.00% | 35.30% |
| Induced Air Flotation (IAF) | NA | | NA | NA | NA | NA | NA | NA | NA |
| Dissolved Air Flotation (DAF) | NA | | NA | NA | NA | NA | NA | NA | NA |
| Centrifuge | 95.00% | | 95.00% | 95.00% | 95.00% | 95.00% | 95.00% | 95.00% | 70.90% |

High "G" Dryer Discharge Distribution: 72.5% to Tracking Screen (150/162a), 27.5% to Centrifuge (150/162b)
Tracking Scrn US (70) Distribn: 100.0% to Recovered Water (188) 0.0% to IAF (192) NA DAF PRODUCT
0.0% to Recycle (138) 0.0% to DAF (196) 0.0% to Centrifuge (200) (228) to Recycle (220)

TABLE 12

PROCESS FLOW SUMMARY

| | | | Solids Flow (dry lb/hr) by Size Fraction, maximum size in mm | | | | | |
|---|---|---|---|---|---|---|---|---|
| Unit Operation | Stream No. and Product | Screen Size Tyler # | 0.701 | 0.701 NA | NA 0.175 | 0.175 NA | NA 0.104 | 0.104 |
| Dredge | 54 | Slurry | 7980 | 0 | 12066 | 0 | 14300 | 29494 |
| Scalping Screen | 114 | OS | 24 | 7980 | 0 | 483 | 0 | 286 | 295 |
| | 110 | US | | 0 | 0 | 11583 | 0 | 14014 | 29199 |
| Rundown Screen | 118 | OS | NA | 0 | 0 | 0 | 0 | 0 | 0 |
| | 122 | US | | 0 | 0 | 11583 | 0 | 14014 | 29199 |
| Shaker Screen | 126 | OS | 80 | 0 | 0 | 11583 | 0 | 420 | 584 |
| (Flowline) | 78 | US | | 0 | 0 | 0 | 0 | 13594 | 28615 |
| Cyclone (High-G) | 150 | UF | | 0 | 0 | 0 | 0 | 544 | 858 |
| | 154 | OF | | 0 | 0 | 0 | 0 | 13050 | 27757 |
| Cyclone Screen | 158 | OS | 150 | 0 | 0 | 0 | 0 | 544 | 34 |
| | 162 | US | | 0 | 0 | 0 | 0 | 0 | 824 |
| CY OF (HIGH G) + Cyclone Scr US to Tracking Screen | 150/162a | | | 0 | 0 | 0 | 0 | 9461 | 20721 |
| CY OF (HIGH G) + Cyclone Scr US to Centrifuge | 150/162b | | | 0 | 0 | 0 | 0 | 3589 | 7860 |
| Tracking Screen | 166 | OS | | 0 | 0 | 0 | 0 | 8042 | 17613 |
| 0.0% to Recycle | 138 | US | | 0 | 0 | 0 | 0 | 0 | 0 |
| 100.0% to Recov Water | 188 | US | | 0 | 0 | 0 | 0 | 1419 | 3108 |
| 0.0% to IAF | 192 | US | | 0 | 0 | 0 | 0 | 0 | 0 |
| 0.0% to UAF | 196 | US | | 0 | 0 | 0 | 0 | 0 | 0 |
| 0.0% to Centrifuge | 200 | US | | 0 | 0 | 0 | 0 | 0 | 0 |
| Induced Air Flotation (IAF) | 208 | FS | | 0 | 0 | 0 | 0 | 0 | 0 |
| | 212 | UF | | 0 | 0 | 0 | 0 | 0 | 0 |
| Dissolved Air Flotation (DAF) | 224 | FS | | 0 | 0 | 0 | 0 | 0 | 0 |
| | 228 | UF | | 0 | 0 | 0 | 0 | 0 | 0 |
| | 220 | RC | | 0 | 0 | 0 | 0 | 0 | 0 |
| | | Water | | 0 | 0 | 0 | 0 | 0 | 0 |
| Centrifuge | 236 | Sludge | | 0 | 0 | 0 | 3409 | 7467 | |
| | 232 | Water | 0 | 0 | 0 | 0 | 179 | 393 | |
| Recovered Water | 188 | Water | | 0 | 0 | 0 | 0 | 1599 | 3501 |
| Recovered Solids | | Solids | | 7980 | 0 | 12066 | 0 | 12702 | 25993 |
| Totals | | | | 7980 | 0 | 12066 | 0 | 14300 | 29494 |

850 gpm flow and 6.81% solids in combined Tracking Screen feed (Streams 150, 162)
850 gpm flow and 6.81% solids in combined Tracking Screen feed and recycle (Streams 138, 150, 162)

TABLE 13

STREAM FLOWS BY WEIGHT

| Unit Operation | Stream No. and Product | | Solids Flow dry lb/hr | Solids Removed cum lb/hr | Solids Content dry wt % | Total Flow lb/hr | Water Flow lb/hr |
|---|---|---|---|---|---|---|---|
| Dredge | 54 | Slurry | 63840 | | 10.00% | 638395 | 574555 |
| Scalping Screen | 114 | OS | 9044 | 9044 | 78.30% | 11550 | 2506 |
| | 110 | US | 54796 | | 8.74% | 626845 | 572049 |
| Rundown Screen | 118 | OS | 0 | 9044 | NA | 0 | 0 |
| | 122 | US | 54796 | | 8.74% | 626845 | 572049 |
| Shaker Screen (Flowline) | 126 | OS | 12588 | 21631 | 84.10% | 14967 | 2380 |
| | 78 | US | 42209 | | 6.90% | 611878 | 569669 |
| Cyclone (High-G) | 150 | UF | 1402 | | 55.00% | 2549 | 1147 |
| | 154 | OF | 40807 | | 6.70% | 609329 | 568522 |
| Cyclone Screen | 158 | US | 578 | 22209 | 75.60% | 765 | 187 |
| | 162 | OS | 824 | | 46.17% | 1785 | 961 |
| CY OF (HIGH G) + Cyclone Scr US to Tracking Screen | 150/162a | | 30182 | | 6.81% | 443057 | 412785 |
| CY OF (HIGH G) + Cyclone Scr US to Centrifuge | 150/162b | | 11448 | | 6.81% | 168056 | 156608 |
| Tracking Screen | 166 | OS | 25655 | 47864.07 | 35.30% | 72677 | 47022 |
| 10.0% to Recycle | 138 | US | 0 | | NA | 0 | 0 |
| 0.0% to Purif Water | 188 | US | 4527 | | 1.22% | 370380 | 365853 |
| 90.0% to IAF | 192 | US | 0 | | NA | 0 | 0 |
| 0.0% to DAF | 196 | US | 0 | | NA | 0 | 0 |
| 0.0% to Centrifuge | 200 | US | 0 | | NA | 0 | 0 |
| Induced Air Flotation (IAF) | 208 | FS | 0 | | NA | 0 | 0 |

TABLE 13-continued

STREAM FLOWS BY WEIGHT

| Unit Operation | Stream No. and Product | | Solids Flow dry lb/hr | Solids Removed cum lb/hr | Solids Content dry wt % | Total Flow lb/hr | Water Flow lb/hr |
|---|---|---|---|---|---|---|---|
| | 212 | UF | 0 | | NA | 0 | 0 |
| Dissolved Air Flotation (DAF) | 224 | FS | 0 | | NA | 0 | 0 |
| | 228 | UF | 0 | | NA | 0 | 0 |
| | 220 | RC | 0 | | NA | 0 | 0 |
| | | Water | 0 | | NA | 0 | 0 |
| Centrifuge | 236 | Sludge | 10876 | 58740 | 70.90% | 15340 | 4464 |
| | 232 | Water | 572 | | 0.3748% | 152716 | 152144 |
| Purified Water | 188 | Water | 5100 | 7.99% | 0.9749% | 523097 | 517997 |
| Solids Product | | Solids | 58740 | 92.01% | 50.9460% | 115299 | 56559 |
| Totals | | | 63840 | 100.00% | 10.0000% | 638395 | 574555 |

As can be seen from the various Tables, the process of FIG. 5, using the recovery efficiencies shown, can effectively reduce the solids contents of the dredged slurry 54 from 10 wt. % to 0.97 wt. % in the purified water stream 188 at relatively high system throughput rates (e.g., 1200 gpm). Accordingly, the present invention is capable of providing a purified water stream having significantly lower solids content at a significantly higher throughput rate than existing waterway restoration operations.

While various embodiments of the present invention have been described in detail, it is apparent that modifications and adaptations of those embodiments will occur to those skilled in the art. However, it is to be expressly understood that such modifications and adaptations are within the scope of the present invention, as set forth in the following claims.

What is claimed is:

1. A screen device for collecting solids in a slurry feedstream, comprising:

a first screen;

a second screen, wherein the first screen is connected at an upper end of the second screen;

a third screen connected at an upper end of the first screen; and a fourth screen connected at a lower end of the third screen, wherein the first screen forms a first angle from horizontal that is different from a second angle from horizontal formed by the second screen to control the velocity of particles collecting on at least one of said first and second screens.

2. The screen device as claimed in claim 1, wherein at least one of said first and second screens is curved to facilitate the transportation of said particles from said first to said second screens.

3. The screen device as claimed in claim 1, wherein the first screen has an opening size smaller than the opening size of the second screen to facilitate dewatering of said particles.

4. The screen device as claimed in claim 1, wherein the screen device is portable.

5. The screen device as claimed in claim 1, further comprising:

a conduit positioned above said first screen for contacting a slurry feedstream therewith; and means extending from said conduit to said first screen for delivering said slurry to a surface of said first screen to substantially inhibit the break-up of particles in said feedstream caused by contact with said surface.

6. The screen device as claimed in claim 1, wherein the first screen is in an opposing relationship to the third screen and the second screen is in an opposing relationship with the fourth screen to form a triangular structure.

7. The screen device as claimed in claim 1, wherein the first angle ranges from about 40 to about 70 degrees.

8. The screen device as claimed in claim 1, wherein the second angle ranges from about 30 to about 60 degrees.

9. The screen device of claim 1, further comprising a mixing zone, wherein the mixing zone has a first horizontal cross-sectional area at an input end of the zone and a second horizontal cross-sectional area at an output end of the zone, wherein the first cross-sectional area is less than the second cross-sectional to decrease the velocity of a slurry feedstream prior to contacting the feedstream with the tracking screen.

10. A system for removing solid materials from a slurry, comprising:

means for controlling the velocity of solid materials in a slurry feedstream; and a tracking screen comprising a first screen connected at an upper end of a second screen, wherein the first and second screens are inclined relative to the horizontal at different angles, the tracking screen being in communication with the means for controlling velocity, wherein the means for controlling velocity comprises a vessel having a first horizontal cross-sectional area at an input end of the vessel and a second horizontal cross-sectional area at an output end of the vessel, wherein the first cross-sectional area is less than the second cross-sectional area.

11. The system of claim 10, further comprising a third screen attached to the first screen and a fourth screen attached to the third screen to form a triangularly shaped structure.

12. The system of claim 10, further comprising:

an in-line mixing device in communication with the input end of the means for controlling velocity, the in-line mixing device including a plurality of mixing blades, wherein the clearance between an outer periphery of the mixing blades and an interior of the in-line mixing device is no more than about 1".

* * * * *

UNITED STATES PATENT AND TRADEMARK OFFICE
CERTIFICATE OF CORRECTION

PATENT NO.   : 6,149,811
DATED         : November 21, 2000
INVENTOR(S)  : Hodges et al.

It is certified that error appears in the above-identified patent and that said Letters Patent is hereby corrected as shown below:

<u>Column 7,</u>
Line 19, please replace the numeral "400%" with the numeral -- 40% --.

<u>Column 10,</u>
Line 19, please delete the numeral "0.0%" and substitute the numeral -- 0.01% --.

<u>Columns 15 and 16,</u>
Table 2, entitled "Process Characteristics", in the row entitled "Shaker Screen" and the column entitled "mm", please replace the numeral "0.105" with the numeral -- 0.104 --.

Table 2, entitled "Process Characteristics", in the row entitle "0.0% to DAF Feedstream", please replace the numeral in brackets "198" with the numeral -- 196 --.

Table 3, entitled "Process Flow Summary", under the column heading "solids flow", in the row beginning with "Stream No. and", in the last column, please insert the numeral -- 0.038 --.

Table 3, entitled "Process Flow Summary", under the column heading "solids flow", in the row beginning with "Product", in the last column, please remove the numeral "0.038".

<u>Columns 17 and 18,</u>
Table 3, entitled "Process Flow Summary", under the column headings "solids flow", in the row beginning with "Stream No. and", in the last column, please insert the numeral -- 0.038 --.

Table 3, entitled "Process Flow Summary", under the column heading "solids flow", in the row beginning with "Product", in the last column, please remove the numeral "0.038".

Table 3, entitled "Process Flow Summary", in the last column, in the row beginning with "78", please change the numeral "9001" to the numeral -- 9801 --.

Table 4, entitled "Stream Flows by Weight", in the column titled "Total Flow", in the row beginning with 228, please change the numeral "594943" to -- 594043 --.

UNITED STATES PATENT AND TRADEMARK OFFICE
CERTIFICATE OF CORRECTION

PATENT NO. : 6,149,811
DATED : November 21, 2000
INVENTOR(S) : Hodges et al.

It is certified that error appears in the above-identified patent and that said Letters Patent is hereby corrected as shown below:

Columns 19 and 20,
Table 5, entitled "Stream Flows by Volume", in the column "Solids Flow cf/cr", in the row beginning with "Dredge", please exchange the numeral "58.71" with the numeral -- 56.71 --.

Table 5, entitled "Stream Flows by Volume", in the column "Solids Flow gpm", in the row beginning with "154 UF", please change the numeral "100.81" to -- 100.61 --.

Table 5, entitled "Stream Flows by Volume", in the column "Solids Density dry lb/cf", in the row beginning with "162 OS", please change the numeral "89.5" to -- 69.5 --.

Table 5, entitled "Stream Flows by Volume", in the column "Total Flow gpm", in the row beginning with "220 RC", please change the numeral "358.5" to -- 356.5 --.

Table 5, entitled "Stream Flows by Volume", in the column "Solids Flow gpm", in the row beginning with "Solids Product", please change the numeral "163.96" to -- 183.96 --.

Columns 23 and 24,
Table 11, entitled "Process Characteristics", in the column "Tracking Screen", in the row beginning with "Scalping Screen", please change the numeral "1.0a%" to -- 1.00% --.

Table 11, entitled "Process Characteristics", in the column "Cyclones", in the row beginning wih "Cyclone Screen", please remove "10.0.00%" and insert -- 100.0% --.

Columns 25 and 26,
Table 12, entitled "Process Flow Summary", in the heading "Solids Flow (dry lb/hr)", please remove the word "maximum" and insert the words -- max/min --.

Table 12, entitled "Process Flow Summary", in the column "Unit Operation", please remove the numeral "232".

Table 12, entitled "Process Flow Sumary", in the column "Stream No. and Product", please remove the word "water" from the first portion of the column and insert the numeral -- 232 -- in the first portion of the column and the word -- water -- in the second portion of the column.

Table 12, entitled "Process Flow Summary", in column "Screen Size Tyler #", please remove the numeral "0".

UNITED STATES PATENT AND TRADEMARK OFFICE
CERTIFICATE OF CORRECTION

PATENT NO. : 6,149,811
DATED : November 21, 2000
INVENTOR(S) : Hodges et al.

It is certified that error appears in the above-identified patent and that said Letters Patent is hereby corrected as shown below:

Columns 25 and 26, (Cont.)
Table 12, entitled "Process Flow Summary", in the column "0.175 NA", in the row beginning with "232 Water", please change the numeral "179" to -- 0 --.

Table 12, entitled "Process Flow Summary", in the column "NA 0.104", in the row beginning with "232 Water", please change the numeral "393" to -- 179 --.

Table 12, entitled "Process Flow Summary", in the Column "0.104", in the row beginning with "232 Water", please insert the numeral -- 393 --.

Table 12, entitled "Process Flow Summary", in the column "0.175 NA", in the row beginning with "Centrifuge", please change the numeral "3409" to -- 0 --.

Table 12, entitled "Process Flow Summary", in the column "NA 0.104", in the row beginning with "Centrifuge", please change the numeral "7467" to -- 3409 --.

Table 12, entitled "Process Flow Summary", in the column "0.104", in the row beginning with "Centrifuge", please insert the numeral -- 7467 --.

Table 13, entitled "Stream Flows by Weight", in the column "Unit Operation", please change the phrase "10.0% to Recycle" to -- 0.0% to Recycle --.

Table 13, entitled "Stream Flows by Weight", in the column "Unit Operation", please change the phrase "0.0% to Purif. Water" to -- 100.0% to Recov. Water --.

Table 13, entitled "Stream Flows by Weight", in the column "Unit Operation", please change the phrase "90.% to IAF" to -- 0.0% to IAF --.

Signed and Sealed this

Ninth Day of July, 2002

Attest:

*Attesting Officer*

JAMES E. ROGAN
*Director of the United States Patent and Trademark Office*